(12) United States Patent
Bertocchi

(10) Patent No.: US 12,550,926 B2
(45) Date of Patent: Feb. 17, 2026

(54) PLANT AND PROCESS FOR PRODUCING PUREE AND/OR JUICE AT HIGH VISCOSITY FROM A FOOD PRODUCT OF VEGETABLE ORIGIN

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 976 days.

(21) Appl. No.: 17/769,738

(22) PCT Filed: Oct. 16, 2020

(86) PCT No.: PCT/IB2020/059771
§ 371 (c)(1),
(2) Date: Apr. 16, 2022

(87) PCT Pub. No.: WO2021/074884
PCT Pub. Date: Apr. 22, 2021

(65) Prior Publication Data
US 2022/0378079 A1    Dec. 1, 2022

(30) Foreign Application Priority Data
Oct. 17, 2019   (IT) ........................ 102019000019148

(51) Int. Cl.
*A23N 1/02*      (2006.01)
*A23L 2/04*      (2006.01)

(52) U.S. Cl.
CPC .................. *A23N 1/02* (2013.01); *A23L 2/04* (2013.01); *A23V 2002/00* (2013.01)

(58) Field of Classification Search
CPC .......... A23L 2/04; A23N 1/02; A23V 2002/00
USPC ............................................................ 99/511
See application file for complete search history.

(56) References Cited

U.S. PATENT DOCUMENTS

| | | | | |
|---|---|---|---|---|
| 2,696,440 A | * | 12/1954 | Olin | A23L 2/04 |
| | | | | 426/489 |
| 4,643,085 A | | 2/1987 | Bertocchi | |
| 2007/0269564 A1 | * | 11/2007 | Bertocchi | A23L 2/04 |
| | | | | 426/489 |
| 2010/0247728 A1 | * | 9/2010 | Bertocchi | A23L 2/04 |
| | | | | 426/489 |

(Continued)

FOREIGN PATENT DOCUMENTS

| | | |
|---|---|---|
| EP | 0511174 A1 | 10/1992 |
| EP | 1684600 A2 | 8/2006 |

(Continued)

*Primary Examiner* — Jimmy Chou
(74) *Attorney, Agent, or Firm* — R. Burns Israelsen

(57) ABSTRACT

A plant for producing juice and/or puree from a food product includes a first extraction section per subject the food product to a first extraction that produces a first extracted food product including puree, or juice, and a first waste product. The plant has a second extraction section that is positioned downstream of the first extraction section and configured to subject an entering product to a second extraction operation to produce a second extracted food product including the puree, or juice, and a second waste product. The first extraction section, the second extraction section and the treatment section thereinbetween have respective rotors configured to rotate about a respective axis, respectively at a first, a second and a third angular velocity. The third angular velocity is greater than both the first and the second angular velocity, but less than 8000 rpm.

33 Claims, 16 Drawing Sheets

(56) References Cited

U.S. PATENT DOCUMENTS

| | | | | |
|---|---|---|---|---|
| 2011/0244100 | A1* | 10/2011 | Bertocchi | A23N 1/02 99/511 |
| 2011/0244101 | A1* | 10/2011 | Bertocchi | A23L 2/04 426/481 |
| 2012/0037013 | A1* | 2/2012 | Bertocchi | A23N 1/02 99/511 |
| 2013/0220146 | A1* | 8/2013 | Bertocchi | A23B 2/465 99/483 |
| 2014/0134318 | A1* | 5/2014 | Catelli | A23L 19/09 99/353 |
| 2014/0373736 | A1* | 12/2014 | Bertocchi | A23N 1/02 99/511 |
| 2018/0049461 | A1* | 2/2018 | Bertocchi | B30B 9/18 |

FOREIGN PATENT DOCUMENTS

| | | | | |
|---|---|---|---|---|
| EP | 2227100 | A2 | 9/2010 | |
| EP | 2611312 | A1 | 7/2013 | |
| EP | 4555872 | A2 * | 5/2025 | A23L 2/04 |
| ES | 2574854 | T3 * | 6/2016 | A23N 1/02 |
| IT | PR20120056 | A1 | 3/2014 | |
| WO | WO-2005039308 | A2 * | 5/2005 | A23N 1/02 |

* cited by examiner

PLANT AND PROCESS FOR PRODUCING PUREE AND/OR JUICE AT HIGH VISCOSITY FROM A FOOD PRODUCT OF VEGETABLE ORIGIN

FIELD OF THE INVENTION

The present invention relates to the food field and, in particular, relates to a plant for producing puree and/or juice with a high viscosity from a food product of vegetable origin.

Furthermore, the invention relates to the process for producing puree and/or juice carried out by the aforementioned plant.

BACKGROUND OF THE INVENTION

As it is known, the industrial extraction of juice and puree mainly from vegetable products, such as fruits and vegetables, is carried out by rotating machines, such as rough extractors and refiner extractors. These, normally, comprise a rotor provided with blades and mounted within a fixed, or movable sieve, having a cylindrical, or conical shape, and provided with holes of determined size. The rotor is operatively connected to a driving group which causes the same to rotate about a rotation axis. The centrifugal force thus generated by the blades of the rotor on the treated product forces the same against the sieve causing the same to be separated into the extracted food product, i.e. the juice, or puree, which passes through the holes of the sieve and is discharged through a first outlet, and the waste part, mainly seeds, skins and petioles which, instead, does not pass through the holes of the sieve and is discharged through a second outlet. See for example at this regard U.S. Pat. No. 4,643,085.

A known process of this type is the extraction at room temperature, also said "cold" extraction, that is, normally, carried out in two steps. In a first step a grinding and/or softening of the food pulps is carried out, for example, applying a series of pulses in quick succession as for example described in EP0511174, and in a second step within an extraction is carried out the aforementioned separation of the treated product into an extracted food product, i.e. the juice and the puree, from the solid parts to be wasted. Normally, the puree extracted at room temperature is, then, heated within a heating plant for blocking the enzymatic activity and stabilizing the same, this process is known as enzymatic inactivation.

Another type of process is the hot extraction, which, instead, provides to carry out the extraction after having heated the product in a heating section up to reach a determined temperature.

A drawback both of the plants for carrying out the "cold" extraction and of the plants for carrying out the "hot" extraction is that when a creamy final product, i.e. having a high viscosity, is to be produced, it is necessary to carry out the extraction working at a high rotation speed of the rotor. In this way, in fact, the turbulence produced by the rotor within the machine during rotation is increased and, therefore, the processed product is homogenized, because a great part of the waste product, which comprises skin, seeds, and petioles, originally present in the product reduces its size and, therefore, can pass through the sieve, thus, increasing the viscosity of the final product.

However, as known, in the extraction section the great part of the main product is that passes through the sieve at the first portion of the same. Therefore, even though a high angular velocities of the rotor is reached, it is, anyway, not possible, to significantly increase the viscosity of the final product, because the resident time of the treated product within the extraction section is, anyway, not sufficient. In addition to the above, working at high angular velocities means also to have high energetic consumptions.

Therefore, with both the cold and hot extraction sections of known type, it is not possible to obtain a creamy product, i.e. having a high viscosity.

In IT PR20120056 a method and related plant for producing puree of fruit are described. The method provides a separation step for separating the juice followed by a thermal treatment for heating the product and therefore a step is provided of sub-molecular disintegrating the extracted product in order to reduce the size of the solid parts to values less than 150 µm. This step is carried out by a rotor which rotates within a stator at a very high velocity. The product obtained during the disintegration step is, then fed into a refiner extractor.

However, the method and the related plant described in IT PR20120056 do not allow to obtain a highly viscous product. In fact, the very high speed at which the rotor is caused to rotate within the stator causes the product to be excessively worked, whereby a decreasing of the viscosity is produced. In addition to the above, the very high speed at which the rotor is caused to rotate within the stator causes the product to be overheated thus unavoidably compromising the organoleptic properties.

SUMMARY OF THE INVENTION

It is, therefore, an object of the present invention to provide a plant for producing puree and/or juice, from a food product of vegetable origin which allows to overcome the prior art drawbacks described above.

It is, in particular, an object of the present invention to provide a plant for producing puree and/or juice, from a food product of vegetable origin which allows to obtain a final creamy product, i.e. with a high viscosity, and, at the same time, to reduce the energetic consumptions.

These and other objects are achieved by a plant, according to the invention, for producing juice and/or puree from a food product of vegetable origin said plant comprising:
 a first extraction section configured to subject said food product to a first extraction operation and comprising:
  an inlet for introducing said food product;
  a first rotor operatively connected to a first driving group configured to cause the first rotor to rotate about a first rotation axis at a first predetermined angular velocity;
  a first sieve provided with a plurality of holes and arranged to be positioned externally to said first rotor, said food product being forced by said first rotor against said first sieve in such a way to divide the same into a first extracted food product comprising said puree, or juice, which passes through said first sieve and is discharged through a first outlet, and in a first waste product which, instead, does not pass through said sieve and is discharged through a second outlet;
 a second extraction section positioned downstream of said first extraction section, said second extraction section being configured to subject an entering product to a second extraction operation, and comprising:
  an inlet for introducing said food product;
  a second rotor operatively connected to a second driving group arranged to cause said second rotor to rotate about a second rotation axis at a second predetermined angular velocity;

a second sieve provided with a plurality of holes and arranged to be positioned about said second rotor, said entering food product being forced by said second rotor against said second sieve in such a way to divide the same into a second extracted food product comprising said puree, or juice, which passes through said second sieve and is discharged through a first outlet, and in a second waste product which, instead, does not pass through said second sieve and is discharged through a second outlet;

whose main characteristic is that between said first and second extraction sections a treatment section is provided comprising an inlet for introducing said first extracted food product, and an outlet for discharging a treated product arranged to be fed into said second extraction section, that said treatment section is configured in such a way that the quantity of extracted food product entered in the treatment section is equal to the quantity of treated food product which exits the same that the treatment section comprises a fixed hollow body cylindrical, or conical shaped within which a third rotor also this cylindrical, or conical shaped is positioned, that said third rotor is operatively connected to a third driving group configured to cause said third rotor to rotate about a third rotation axis at a third predetermined angular velocity ($\omega 3$), that said third predetermined angular velocity ($\omega 3$) is greater than said first angular velocity ($\omega 1$) and said second angular velocity ($\omega 2$), and that the third predetermined angular velocity ($\omega 3$) is less than 8000 rpm, in such a way that said second extracted food product has a high viscosity.

Other features of the invention and related embodiments are defined by the dependent claims.

According to another aspect of the invention, a method for producing juice and/or puree from a food product comprises the steps of:

extracting, within a first extraction section, a starting food product, said extraction section being equipped with a first sieve provided with a plurality of holes and with a first rotor mounted within said first sieve and operatively connected to a first driving group, said first driving group being arranged to cause said first rotor to rotate about a first rotation axis to generate a centrifugal force which pushes said starting food product against said sieve causing the same to be divided into a first extracted food product which passes through the holes of said first sieve and is discharged through a first outlet and a first waste product, which does not pass through said holes of said sieve and is discharged through a second outlet;

feeding a predetermined quantity of said first extracted food product into a treatment section positioned downstream of said first extraction section;

treating said first extracted food product within said treatment section obtaining a treated product;

discharging a predetermined quantity of said treated product from said treatment section, said predetermined quantity of said discharged treated product being equal to said predetermined quantity of said first extracted food product fed into said treatment section;

feeding said treated product into a second extraction section, said second extraction section being equipped with a second sieve provided with a plurality of holes and with a second rotor mounted within said second sieve and operatively connected to a second driving group, said second driving group being arranged to cause said second rotor to rotate about a second rotation axis to generate a centrifugal force which pushes said treated food product against said second sieve causing the division of the same into a second extracted food product which passes through the holes of said second sieve and is discharged through a first outlet and a second waste product which does not pass through said holes of said second sieve and is discharged through a second outlet;

whose main characteristic of said method is that the quantity of said product fed into said treatment section is equal to the quantity of said product discharged from said treatment section and fed into said second extraction section, that said treatment is carried out by a third rotor cylindrical, or conical shaped positioned within a fixed hollow body also this cylindrical, or conical shaped that said third rotor is operatively connected to a third driving group configured to cause said third rotor to rotate about a third rotation axis at a third predetermined angular velocity ($\omega 3$), that said third predetermined angular velocity ($\omega 3$) is said third predetermined angular velocity ($\omega 3$) is greater than both the first angular velocity ($\omega 1$) and the second angular velocity ($\omega 2$), and that said third predetermined angular velocity ($\omega 3$) is less than 8000 rpm, in such a way that said second extracted food product has a high viscosity.

BRIEF DESCRIPTION OF THE DRAWINGS

The invention will be now illustrated with the following description of an exemplary embodiment thereof, exemplifying but not limitative, with reference to the attached drawings wherein.

Figure 1:
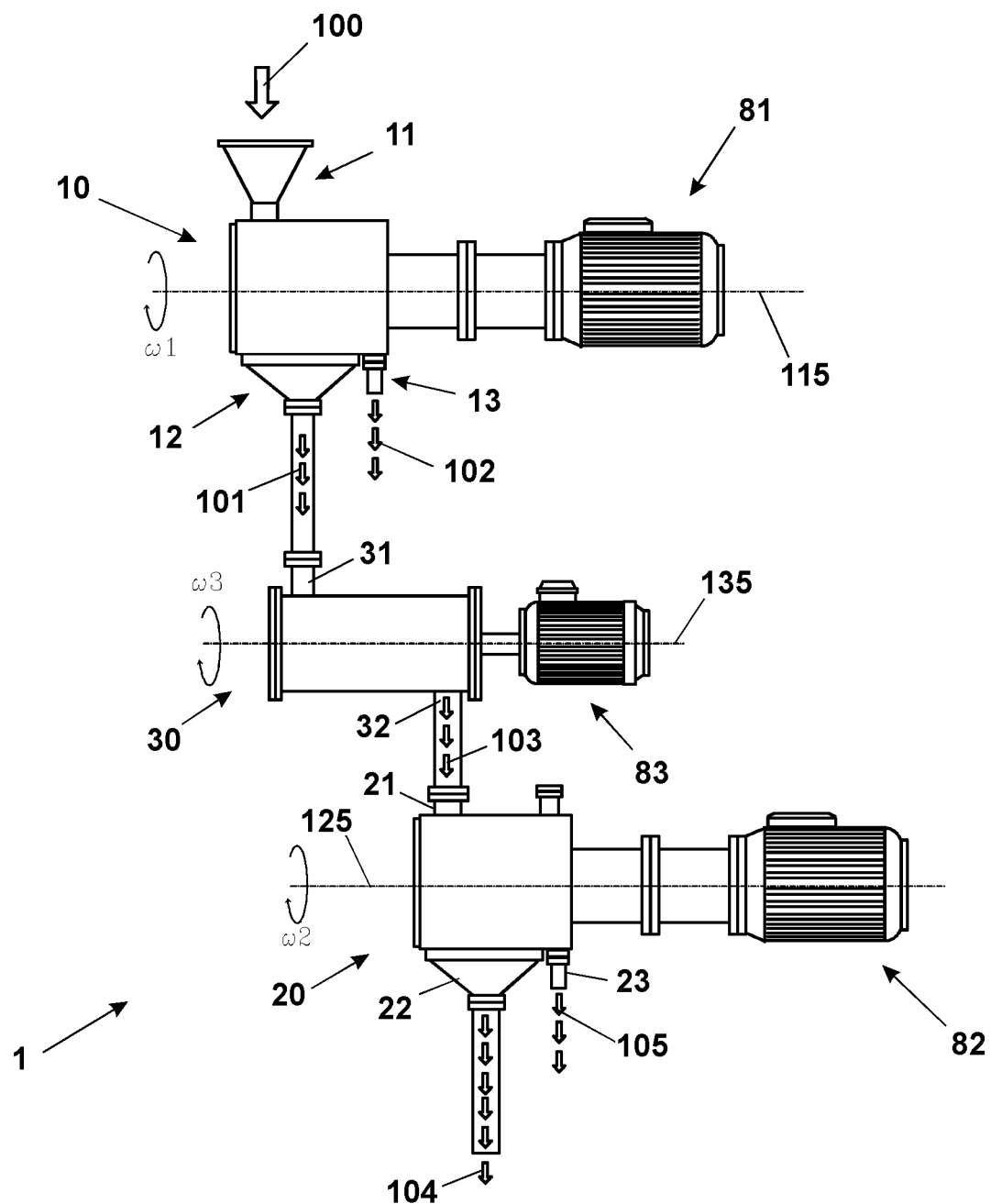
FIG. 1 diagrammatically shows a first embodiment of the plant, according to the invention, for producing puree, or juice, from a food product of vegetable origin.
Figure 4:
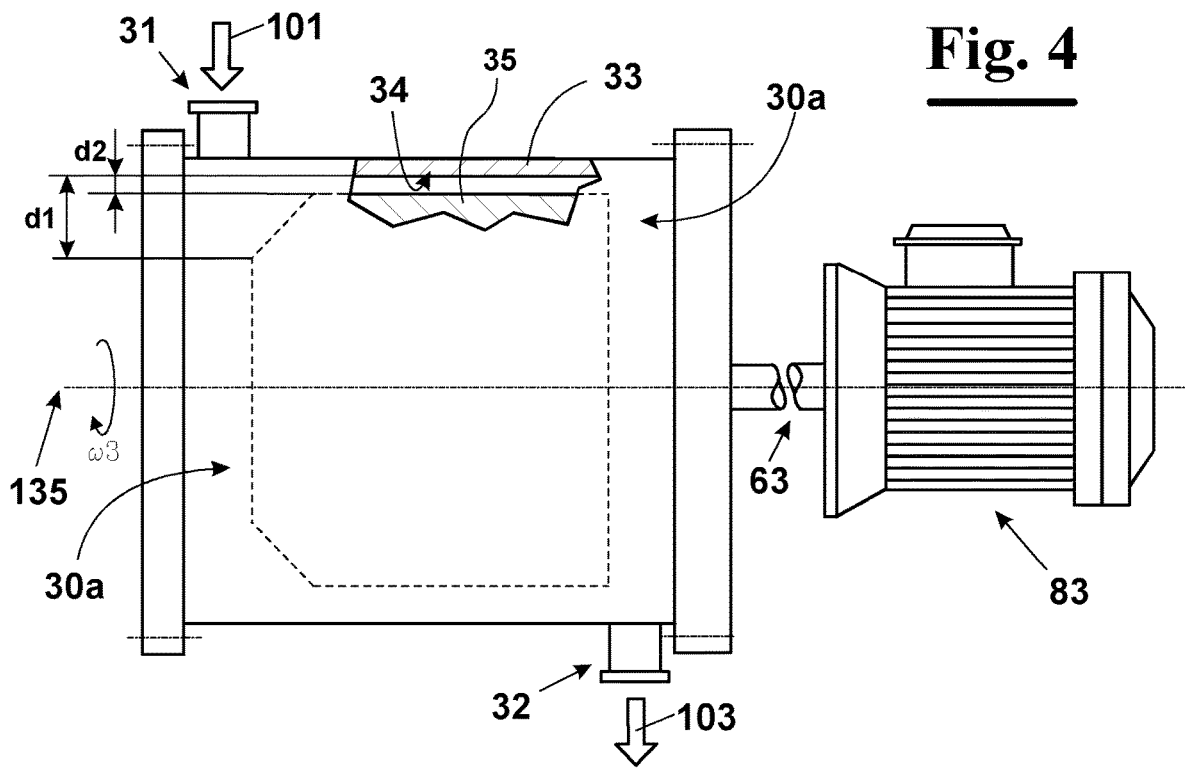
FIG. 4 diagrammatically shows longitudinal cross-section view the treatment section of the plant of FIG. 1.
Figure 6:
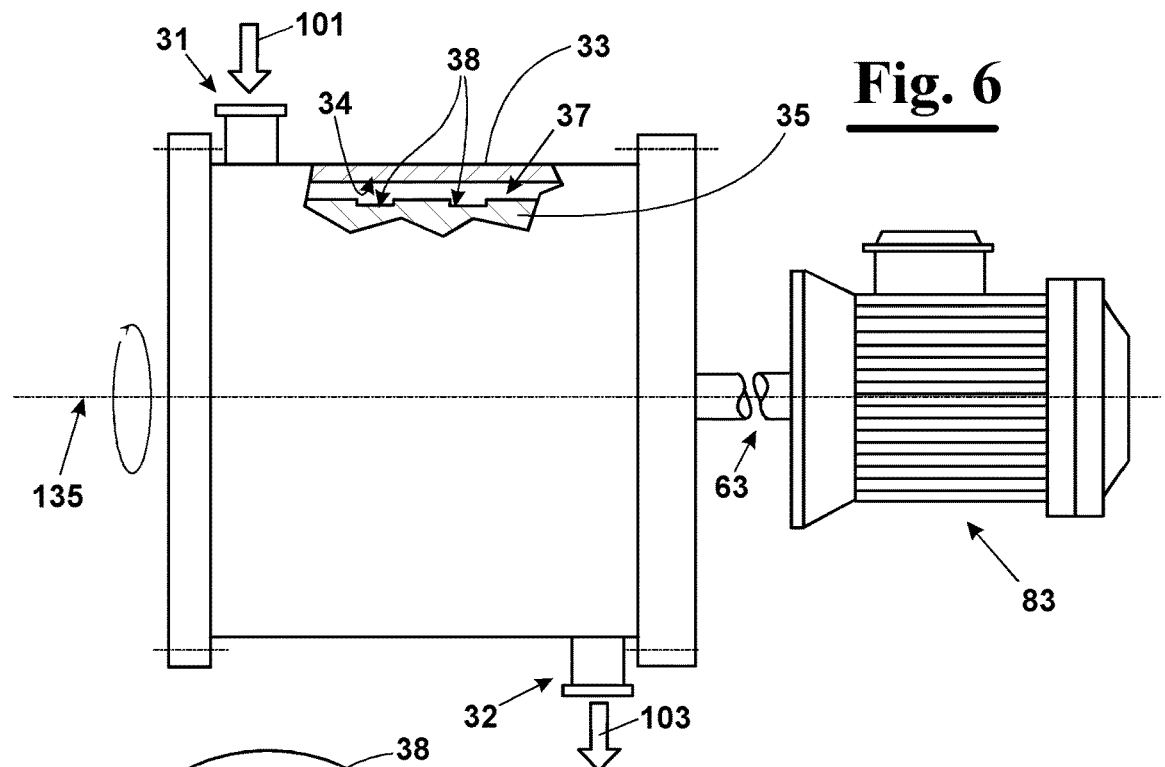
Figure 7B:
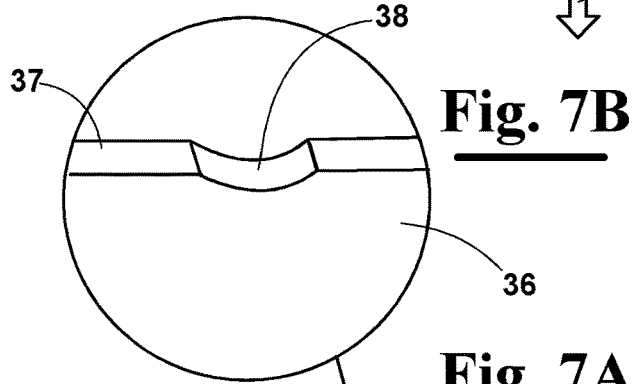
Figure 7A:
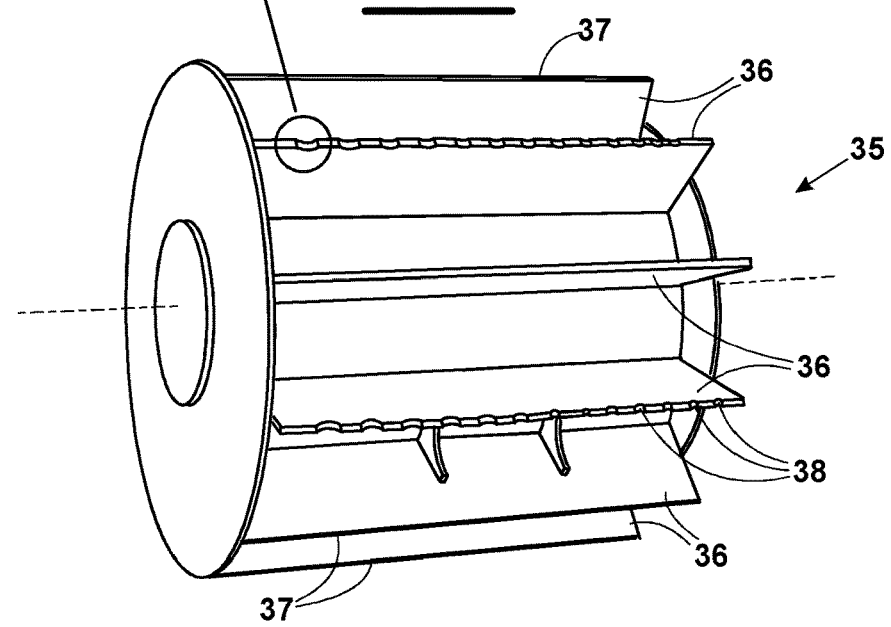
Figure 8A:
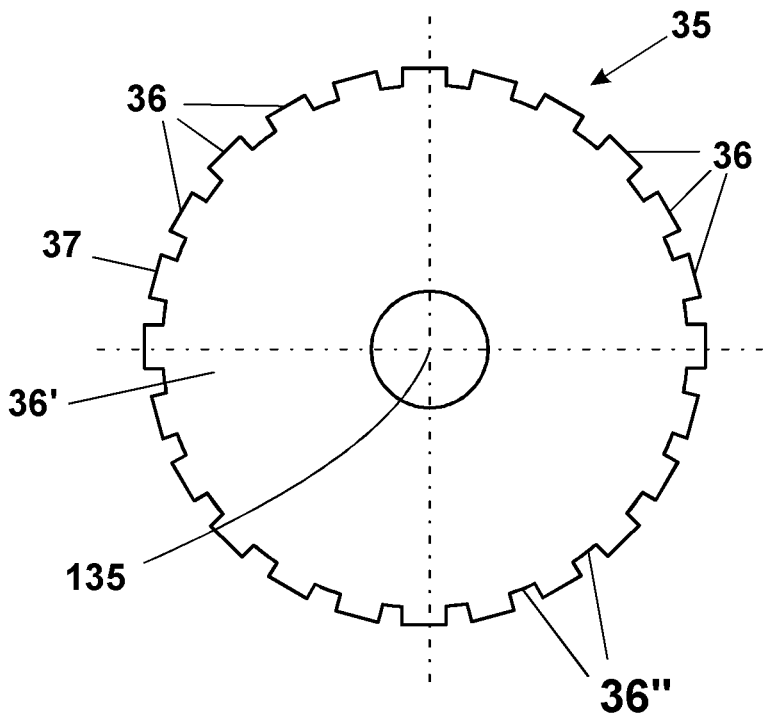
Figure 8B:
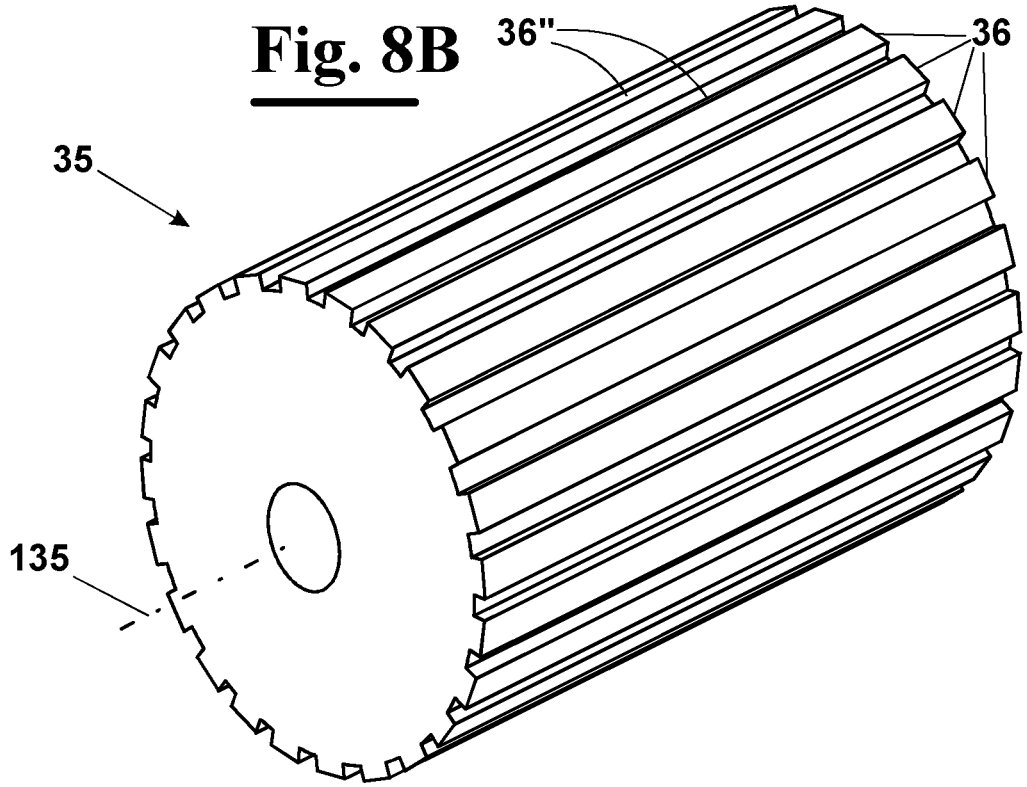

Figures from 5A to 5F show transversal cross-section views of some possible embodiments of the treatment section of FIG. 4;

FIG. 6 diagrammatically shows longitudinal cross-section view a possible alternative embodiment treatment section of FIG. 4;

FIG. 7A shows a perspective side elevation view of the rotor of the treatment section of FIG. 6;

FIG. 7B diagrammatically shows an enlargement of a portion of a blade of the rotor of FIG. 7A;

FIGS. 8A and 8B diagrammatically show a front view and a perspective view, respectively, of another embodiment provided by the invention for the rotor of the treatment section;

Figures from 9 to 18 diagrammatically show further embodiments of the plant of FIG. 1 provided by the present invention.

DETAILED DESCRIPTION OF SOME EXEMPLARY EMBODIMENTS OF THE INVENTION

As diagrammatically shown in FIG. 1, a plant 1, according to the invention, for producing juice and/or puree from a starting food product of vegetable origin 100, comprises a first extraction section 10 in which the starting food product 100 is introduced through an inlet 11 to be subjected to a first extraction operation.

Figure 2:
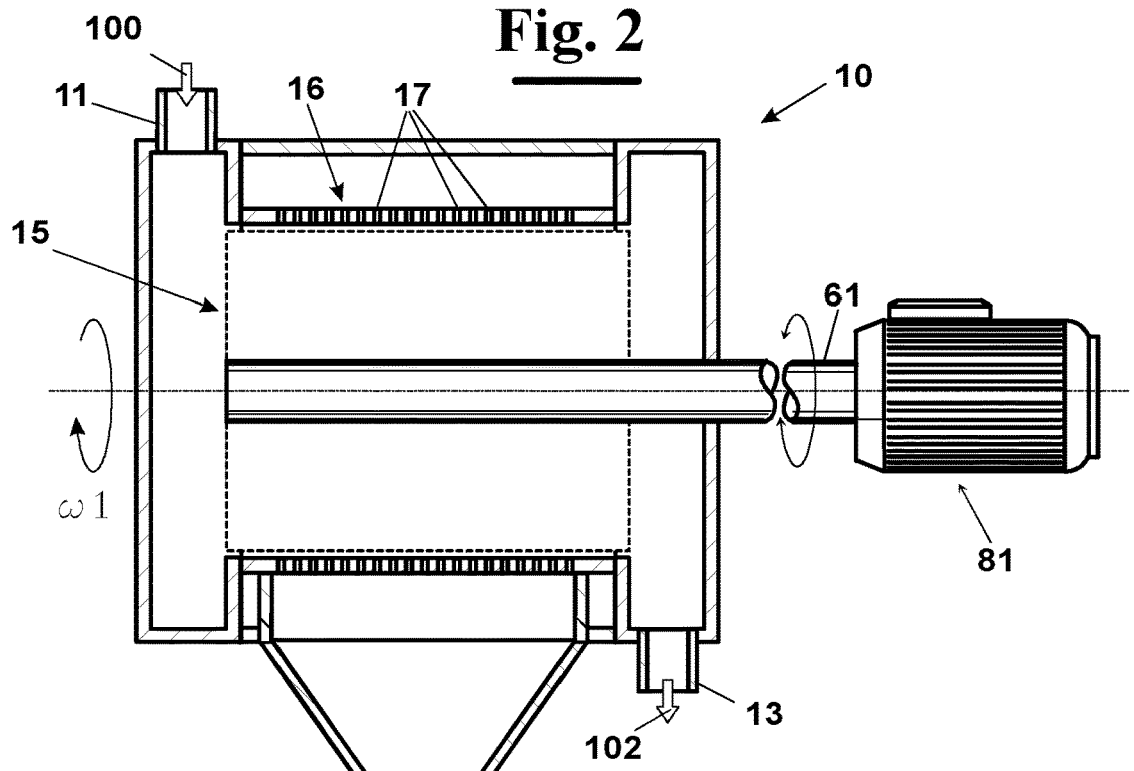
FIGS. 2 and 3 diagrammatically show longitudinal cross-section view, respectively, of the first and the second extraction sections of the plant of FIG. 1.

More in particular, come diagrammatically shown in FIG. 2, the first extraction section 10 comprises a first rotor 15 operatively connected to a first driving group 81, advantageously by a motor shaft 61, to be caused to rotate about a first rotation axis 115 at a first predetermined angular velocity ω1. Externally to the first rotor 15, surrounding the same, a first sieve 16 is positioned provided with a plurality of holes 17. As it is known, the rotation of the first rotor 15 generates a centrifugal forces which forces the food product 100 against the sieve 16 causing the same to be divided into a first extracted food product 101 comprising the puree and/or the juice, which passes through the first sieve 16 and is discharged through a first outlet 13, and in a first waste product 102 which, instead, does not pass through the first sieve 16 and is discharged through a second outlet 14. The first extracted food product 101 is discharged from the first extraction section 10 and, therefore, fed through an inlet 31 into a treatment section 30 positioned downstream of the first extraction section 10. In particular, the treatment section 30 is arranged to treat the first extracted food product 101 and to discharge the obtained treated product 103 through an outlet 32. The treatment section 30 is, advantageously, configured in such a way that the quantity of product 101 that is introduced is equal to the quantity of treated product 103 discharged from the treatment section 30.

Figure 3:
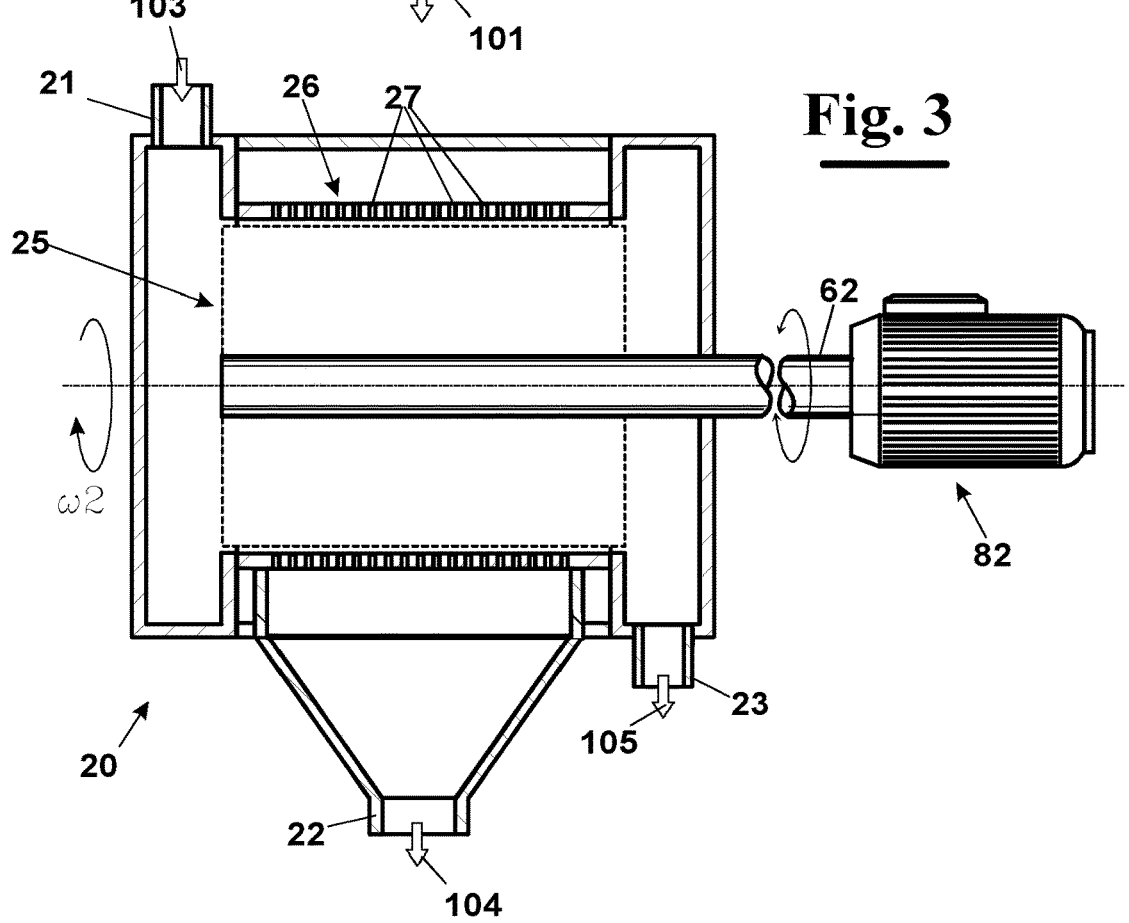

According to what is provided by the invention, the treated product 103 discharged through the outlet 32 is fed into a second extraction section 20 positioned downstream of the treatment section 30 and configured in such a way to carry out a second extraction operation. In particular, as diagrammatically shown in FIG. 3, the second extraction section 20 is configured analogously to the first extraction section 10. More in particular, the second extraction section 20 provides an inlet 21 for introducing the treated product 30. Within the second extraction section 20 a second rotor 25 is installed operatively connected to a second driving group 82, which provides to cause the same to rotate about a second rotation axis 125 at a second predetermined angular velocity ω2. Externally to the second rotor 25, surrounding the same, a second sieve 26 is positioned provided with a plurality of holes 27. More precisely, the treated product 103 introduced through the inlet 21, is forced by the second rotor 25 against the second sieve 26 and is, therefore, divided into a second extracted food product 104 comprising the puree and/or the juice, which passes through the second sieve 26 and is discharged through a first outlet 23, and in a second waste product 105 which, instead, does not pass through the second sieve and is discharged through a second outlet 24. In particular, the holes 17 of the first sieve 16 of the first extraction section 10 can have size greater than the size of the holes 27 of the second sieve 26 of the second extraction section 20. Therefore, in the first extracted food product 101 in addition to puree and juice, a great quantity of a more fibrous product, essentially consisting of skins and seeds is also present that pass through the holes 17 of the sieve 16. This part of fibrous product is discharged from the first extraction section 10 together with the extracted food product 101, is shredded into the treatment section 30 due to the high mechanical stress subjected to the same. Therefore, when the treated product 103 is subjected to the successive extraction step that is carried out into the second extraction section 20, high quantity of the fibrous part of the processed product are able to pass through the holes 27 of the sieve 26 thus, increasing, the viscosity of the second extracted food product which will be, therefore, "dense" and "creamy".

This result cannot be, instead, achieved by the prior art extractors, or finishers, where the resident time of the product within the machine is not sufficient to significantly increase the viscosity of the extracted product.

As diagrammatically shown in the FIGS. 4 to 7, the treatment section 30 comprises a hollow body 33 provided with an internal wall 34 and within which a third rotor 35 is installed that have a plurality of blades 36 arranged substantially radially. More precisely, the third rotor 35 is operatively connected to a third driving group 83 by a third motor shaft 63 (FIG. 4). The third driving group 83 is arranged to cause the third rotor 35 to rotate about a third rotation axis 135 at a third predetermined angular velocity ω3. This, according to what is provided by the invention, is greater than both the first angular velocity (ω1) and the second angular velocity (ω2). In particular, the third predetermined angular velocity (ω3) can be less than 8000 rpm, in such a way that the second extracted food product has a high viscosity.

In particular, the third predetermined angular velocity ω3 can be comprised between 1500 and 7000 rpm, advantageously, between 1500 and 6000 rpm. In particular, the third predetermined angular velocity ω3 can be less than 5000 rpm, more in particular comprised between 1500 and 4500 rpm.

Advantageously, the third predetermined angular velocity ω3 can be less than 3500 rpm, for example comprised between 900 and 3000 rpm, preferably comprised between 1200 and 2700 rpm.

In particular, it has been observed that for angular velocities in the treatment section 30 greater than determined values the product is laminated so much too cause a decreasing, and not an increasing of its viscosity, which is, instead, the scope of the present invention. Furthermore, angular velocities ω3 greater than the aforementioned threshold value causing the product to be overheated thus modifying its organoleptic properties. In addition to the above, the solution according to the invention allows to avoid that the treated product, when moves from the treatment section 30 to the second extraction section 20 can be subjected to an abrupt slowdown. In fact, the angular velocity ω2 of the rotor of the second extraction section 20 is, advantageously, less than 4000 rpm, advantageously comprised between 800 and 4000 rpm, in particular comprised between 1000 and 2500 rpm.

An abrupt slowdown of the product, in fact, could make difficult the movement of the same from the treatment section 30 to the second extraction section 20, and could cause the product to be accumulated downstream of the treatment section 30 and, therefore, a clogging of the ducts and the sections involved with the need to stop the machine in order to remove the product, with consequent loss of productivity, time and product.

According to an embodiment, the first angular velocity ω1 can be less than the second angular velocity ω2. For example, the first angular velocity ω1 can be comprised between 400 and 1000 rpm, advantageously comprised between 500 and 900 rpm.

Figure 5A:
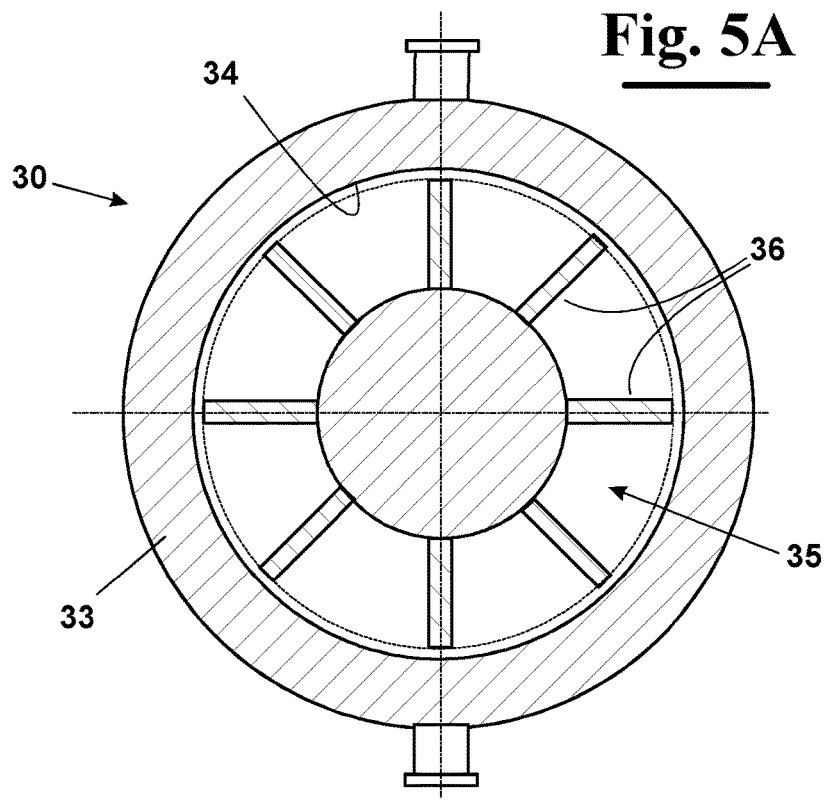
Figure 5B:
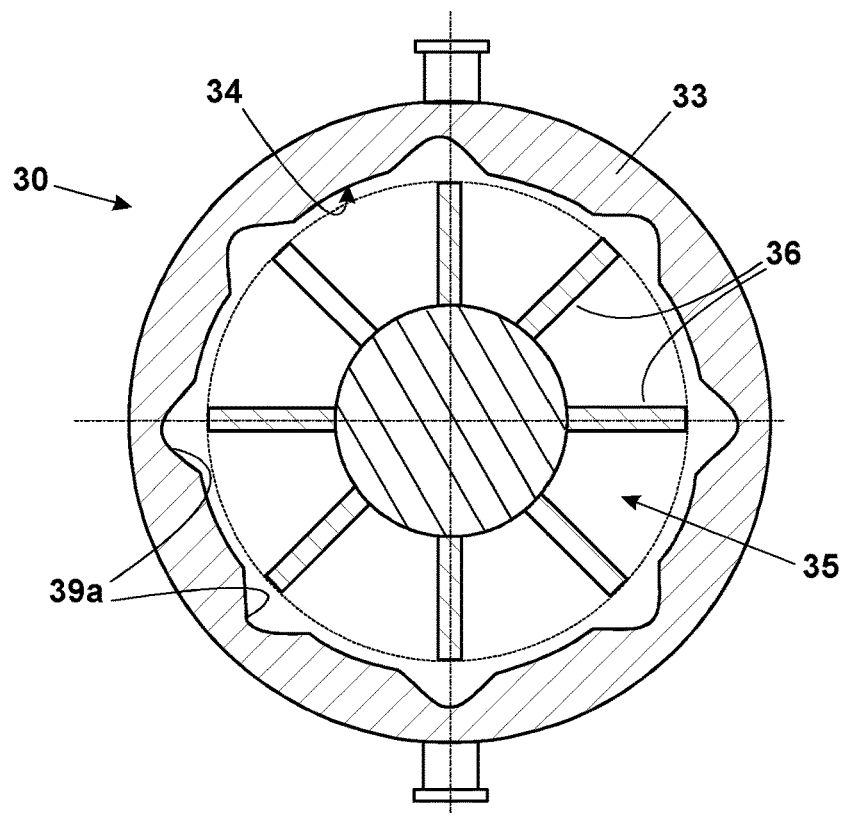
Figure 5C:
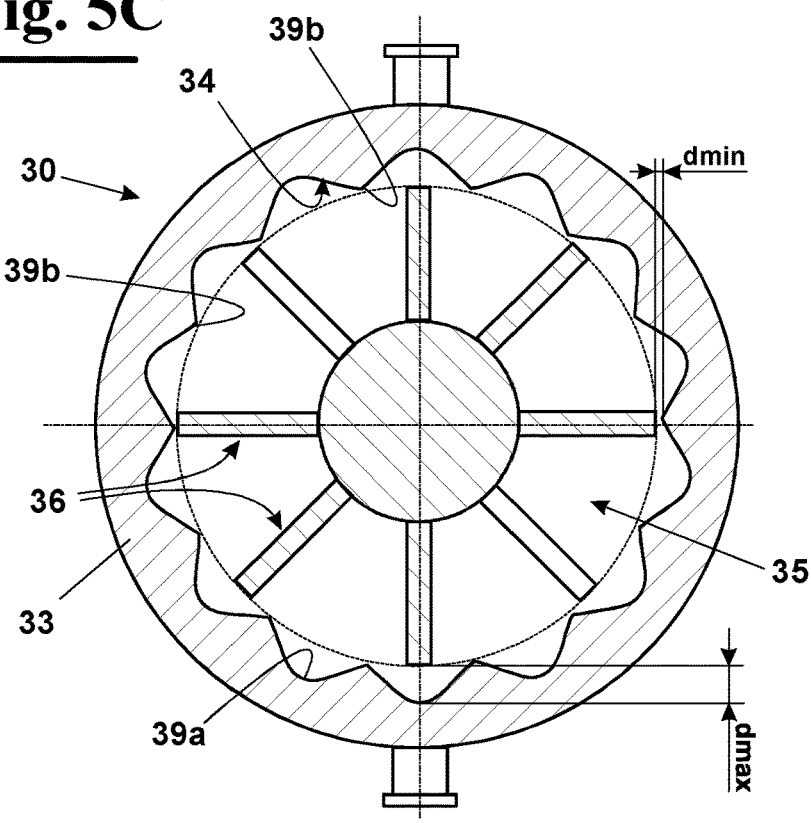
Figure 5D:
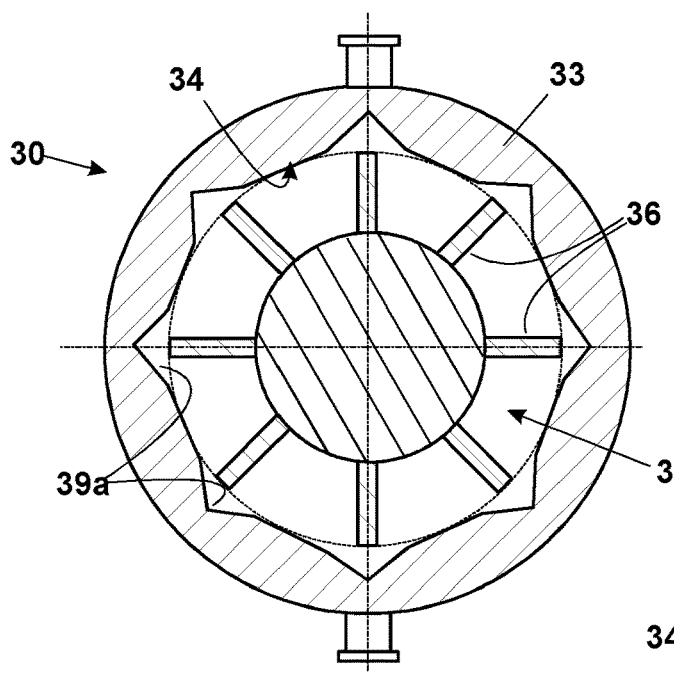

In particular, the internal wall 34 of the hollow body can have a cylindrical, or conical, surface, substantially "smooth" (FIG. 5A). Alternatively, the internal wall 34 of the hollow body 33 can be "waved" and provided with a plurality of recessed portions 39a from a base surface (FIG. 5B). In a further embodiment of the invention, the internal wall 34 of the hollow body 33 can comprise a plurality of recessed portions 39a and a plurality of protruding portions 39b with respect to a base surface alternating to each other (FIG. 5C).

Figure 5E:
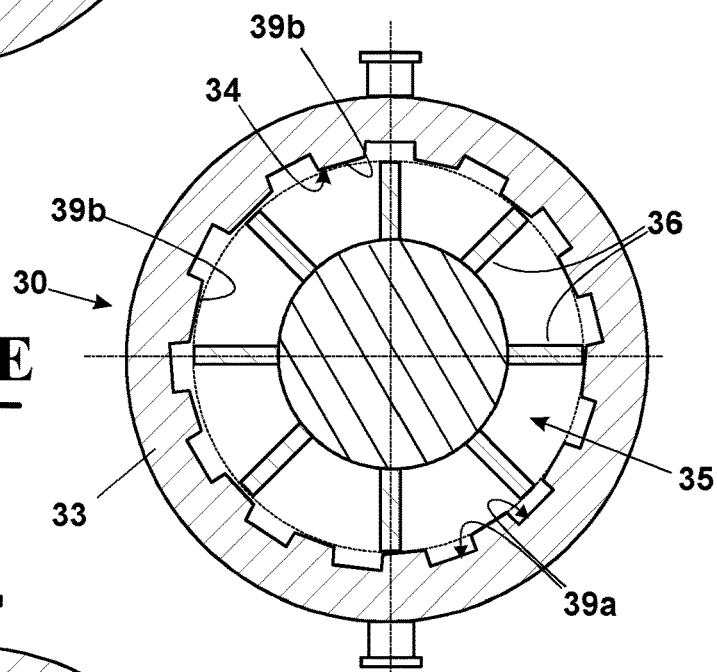
Figure 5F:
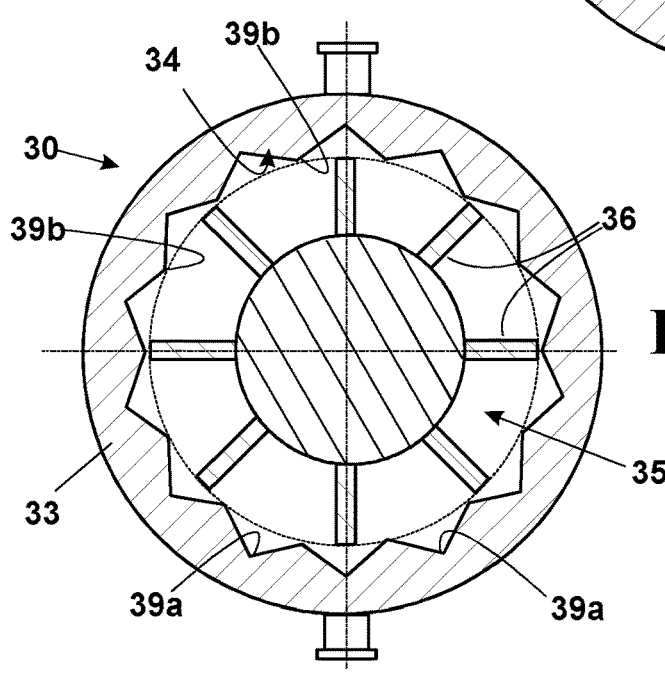

In further embodiments of the inventions, the internal wall 34 of the hollow body 33 can comprise a series of straight portions forming the recessed portions 39a from the base surface (FIG. 5D), or recessed portions 39a and protruding portions 39b alternating to each other, in which the straight portions are connected in such a way to form sharp edges (FIGS. 5E and 5F). In particular, as shown in FIG. 5C, the recessed portions 39a of the internal wall 34 of the fixed hollow body 33 are positioned at a maximum distance dmax from rotor 35, in particular from the ends of its blades 36, instead, the protruding portions 39b are positioned at a minimum distance dmin from rotor 35. More in particular, the ratio between the maximum distance dmax and the minimum distance dmin can be comprised between 1 and 20, i.e. 1≤dmax/dmin≤20, advantageously comprised between 1 and 10, i.e. 1≤dmax/dmin≤10. For example, the minimum distance dmin can be comprised between 0.1 mm and 10 mm, advantageously between 0.2 mm and 10 mm, preferably between 0.5 mm and 5 mm.

According to an embodiment provided by the invention and diagrammatically shown in FIG. 4, the fixed hollow body 33 and the rotor 35 of the treatment section 30 can be positioned at a first distance d1, at a first end 30a, in particular closer to inlet 31, and at a second distance d2, with d2<d1, at a second end 30b, in particular further from inlet 31. In this way a "funnel" is formed that assists the introduction of the product between the rotor 35 and the internal wall 34 of the fixed hollow body 33 and its movement along the treatment section 30. The difference between the first and the second distance d1 and d2 can be obtained, in case that the wall 34 and the rotor 35 are both substantially cylindrical shaped, as shown in FIG. 4, by providing for the rotor 35 a portion tapered at its end closer to inlet 31 which, then, increases its cross-section and, therefore, maintains its distance from the internal wall 34, constant to value d2 up to the end 30b. In case that the wall 34 is substantially cylindrical shaped and the rotor 35 substantially conical shaped, this latter is, advantageously, provided having the portion with the smaller cross-section positioned closer to the inlet 31 that increase going towards outlet 32. In case that both the internal wall 34 and the rotor 35 are substantially conical shaped the aforementioned reduction of the distance from d1 to d2 can be obtained by a different conicities between the two surfaces. These two last cases are not shown in figure for reason of simplicity but can be easily derived by the skilled person in the art from the embodiment of FIG. 4.

Advantageously, the aforementioned cylindrical, or conical, surface of the hollow body 33, or its planar development, can be at least equal to 50% of the surface of the second sieve 26 of the second extraction section 20, or its planar development, advantageously equal at least to 60% of the surface of the second sieve 26, or its planar development, preferably at least to 70% of the surface of the second sieve 26, or its planar development.

In this way, the product treated in the treatment section 30 is subjected to a strong treatment for the time necessary to longitudinally cross the aforementioned surface of the hollow body 33, that is much higher than the prior art solutions. Therefore, with respect to the prior art solutions, the fibrous fraction of the treated product is shredded and, once introduced into the second extraction section 20, passes through the sieve together with the second main product.

In particular, at least one between the first sieve 16 of the first extraction section 10, and the second sieve of the second extraction section 20 is conical, or cylindrical shaped. More in particular, in case that the sieve is substantially conical, or cylindrical shaped, also the corresponding first and/or second rotor 15, or 25, is, advantageously, substantially conical, or cylindrical shaped.

According to an embodiment of the invention, diagrammatically shown in the FIGS. 1, 4, 6 and from 9 to 14, the aforementioned third rotation axis 135 can be a horizontal, or substantially horizontal, rotation axis in particular forming an angle smaller than, or equal to 30° with respect to the horizontal direction. This technical solution allows, in particular, to control more accurately the aforementioned treatment section 30 with respect to the technical solutions with inclined, or vertical, axis, where the gravity force introduces forces and stresses that are difficult to control.

According to an embodiment of the invention, the second predetermined angular velocity ω2 can be comprised between 900 and 2800 rpm, in particular, between 1000 and 2500 rpm, advantageously between 1600 and 2500 rpm.

According to an alternative embodiment of the invention diagrammatically shown in the figures from 6 to 7B, at least a part of the aforementioned blades 36 of the rotor 35, at the edge 37 which faces, in use, towards the aforementioned internal wall 34 of the hollow body 33, can be provided with a plurality of recessed portions, or depressions, 38. All the recessed portions 38 can have the same width and depth, or, as provided by an alternative embodiment of the invention, can have a width and/or a depth which decreases going from the inlet 31 to the exit 32 of the treatment section 30.

In particular, the recessed portions, or depressions, change the axial velocity of the product into the treatment section 30 and create turbulences which contributes to further increase the viscosity of the treated product.

As diagrammatically shown in the FIGS. 8A and 8B, respectively in a front view and in a perspective view, according to an embodiment provided by the invention, the blades 36 of the aforementioned rotor 35 can be portions radially protruding from a main body 36'. In particular, the blades 36 can be obtained subjecting a starting full cylindrical, or conical, body to a working step, for example, a milling step arranged to make a series of longitudinal recessed portions 36". Also in this case, the edges 37 of the blades 36 can be provided with the aforementioned depressions 38.

Alternatively, the blades 36 can be independent bodies which are fixed, for example by welding, to a main body.

Figure 9:
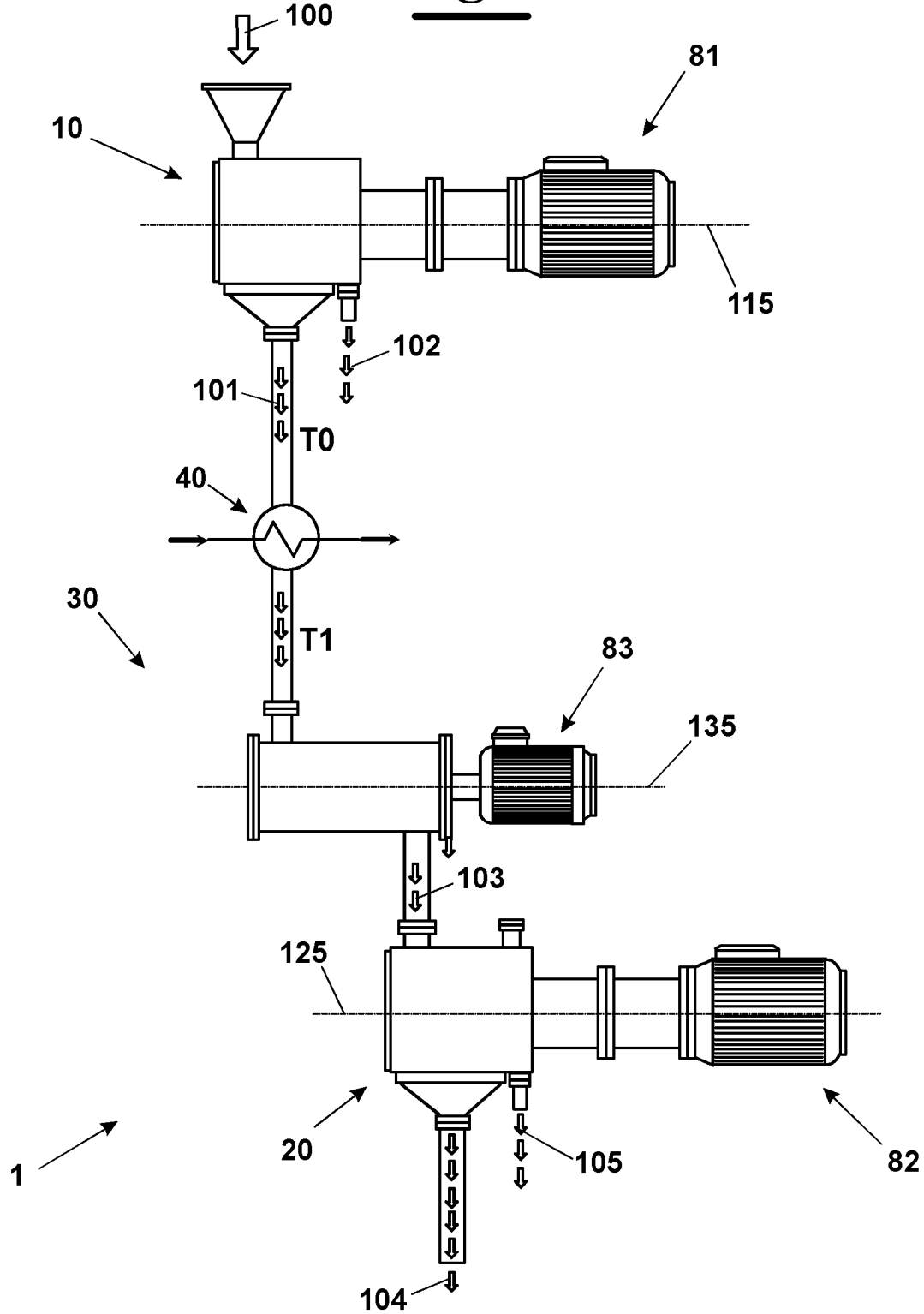

In FIG. 9 an alternative embodiment of plant 1, according to the invention, is diagrammatically shown, wherein between the first extraction section 10 and the treatment section 30 a heating section 40 is provided configured to heat the first extracted food product 101 from a first temperature T1 to a second temperature T2 with T2>T1. For example, the heating section 40 can be configured to heat the product from a temperature T1 comprised between 0° C. and 25° C. to a temperature T2 comprised between 65° C. and 110° C., advantageously a temperature T2 comprised between 65° C. and 85° C., or a temperature T2 comprised between 85° C. and 110° C.

Figure 10:
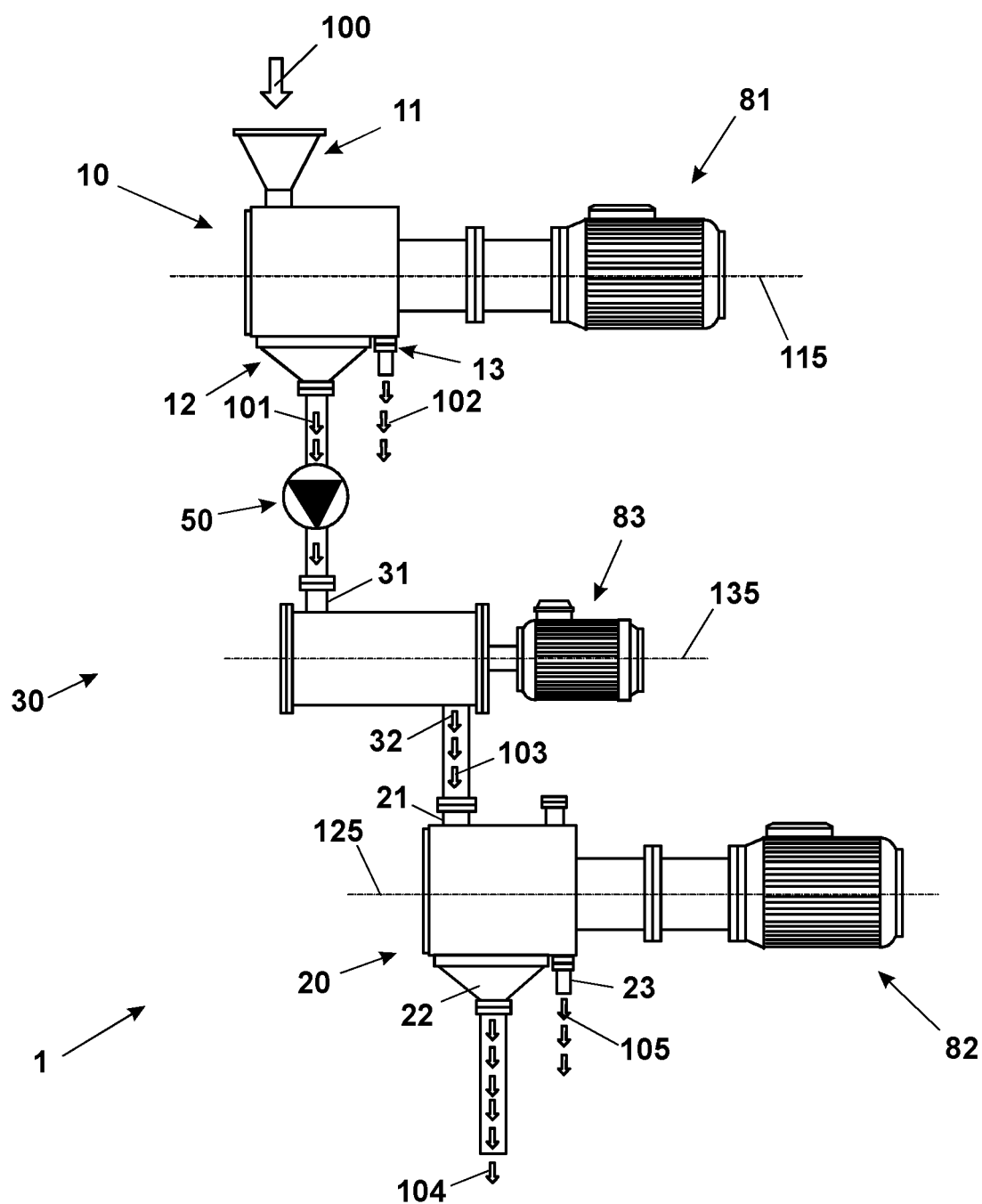

Even though it is possible to discharge the first extracted product 101 from the first extraction section 10 to the treatment section 30 by gravity, it is also provided the possibility, diagrammatically shown in FIG. 10, that the first extracted food product 101 can be sucked at the outlet 12 of the first extraction section 10 and fed into the treatment section 30 by a pumping device 50.

Figure 11:
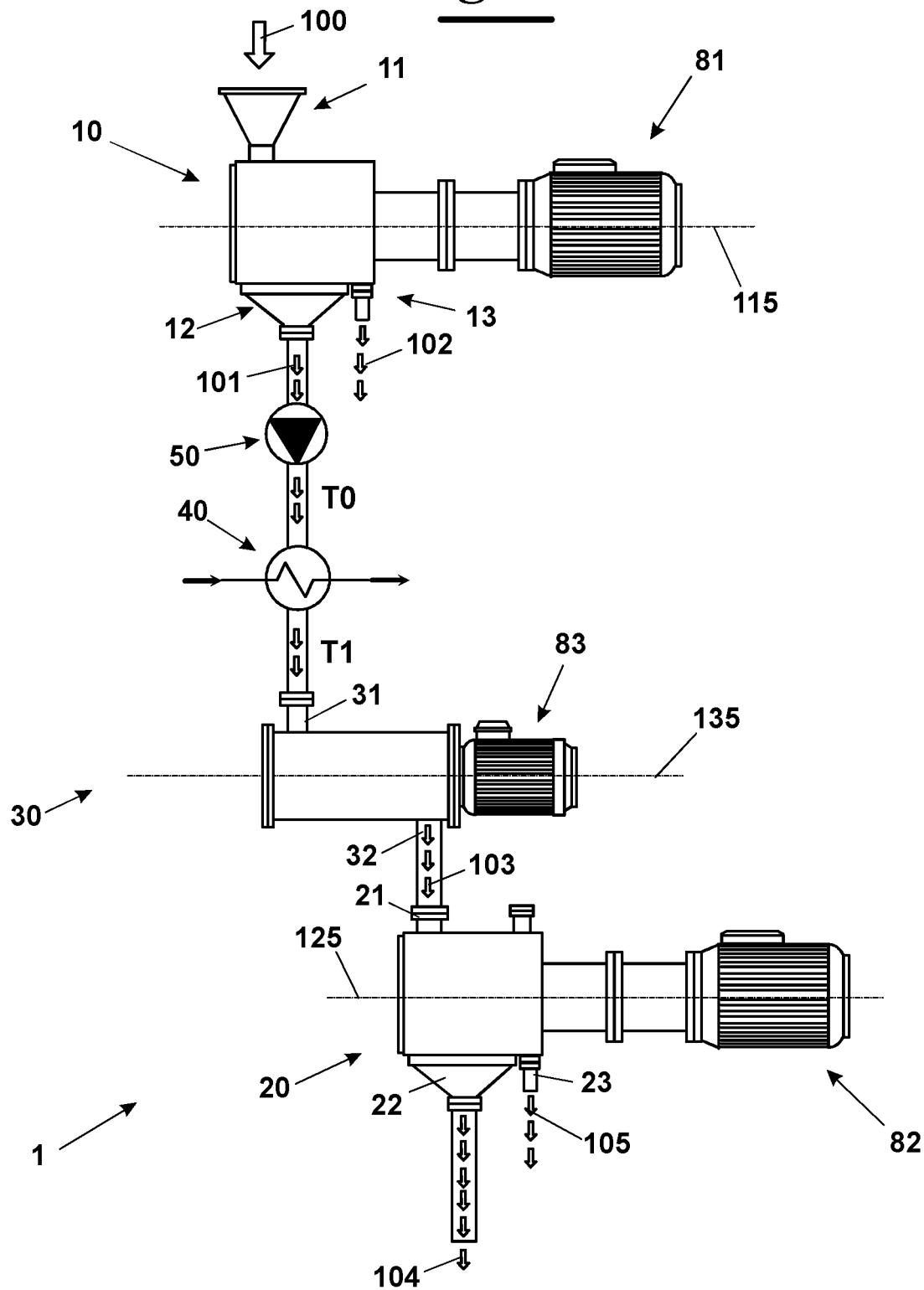

As diagrammatically shown in FIG. 11, furthermore, in a further embodiment of the invention, the possibility is also provided that both the heating section 40, as described above with reference to FIG. 9, and the pumping device 50, as described above with reference to FIG. 10, can be positioned between the first extraction section 10 and the treatment section 30.

According to an embodiment of the invention, the treatment section 30 is positioned at a first height h1 from a base surface, and the second extraction section at a second height h2, with h1>h2. In this case, the treated product 103 exiting the treatment section 30 can be arranged to be introduced into the second extraction section 20 by gravity. According to an alternative embodiment, but not shown for reasons of simplicity, between the treatment section 30 and the second extraction section 20, a pumping device can be positioned that is arranged to suck the treated product 103 from the outlet 32 and to feed the same into the second extraction section 20 at the inlet 21.

Figure 12:
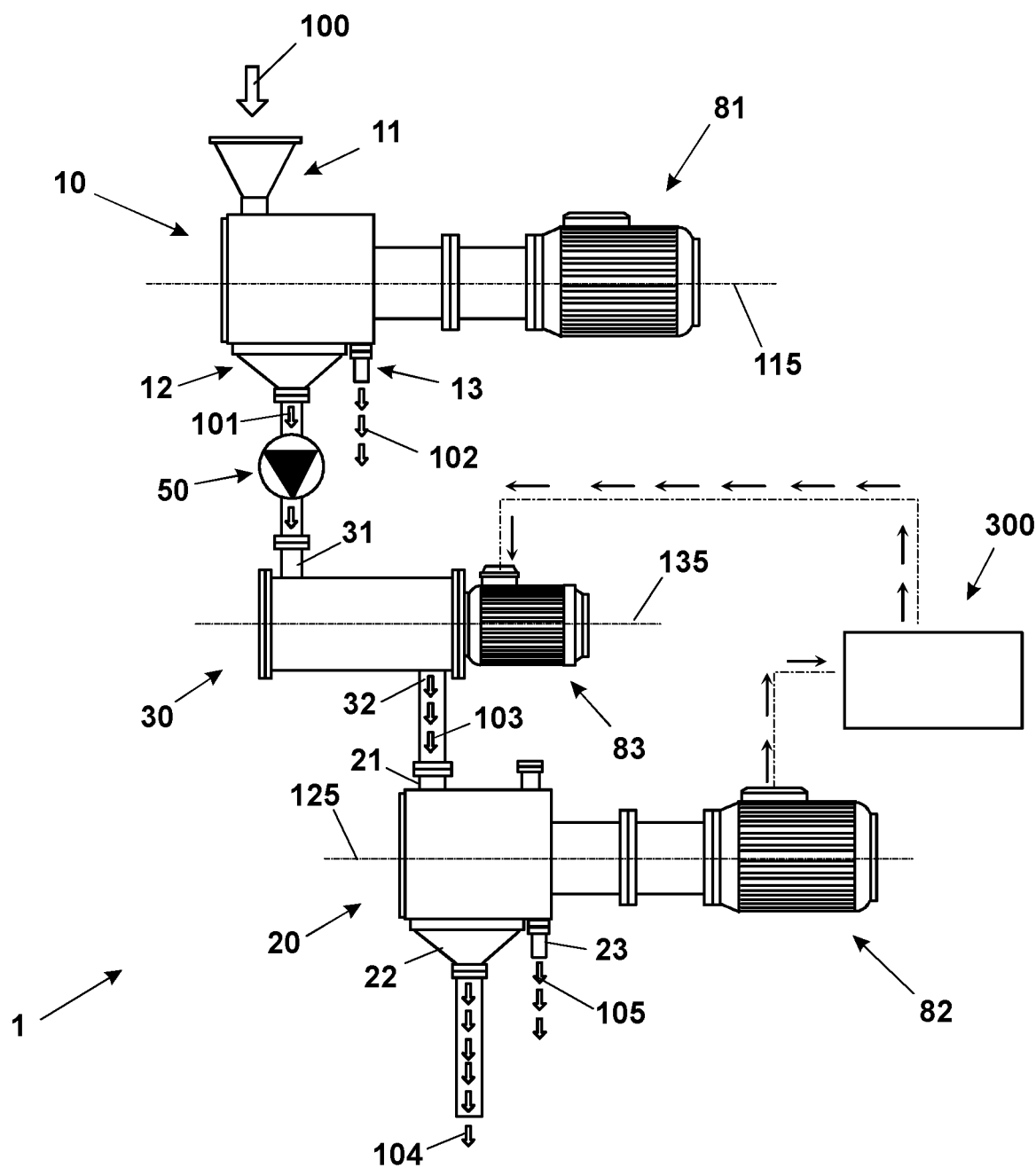

As diagrammatically shown in FIG. 12, according to a further embodiment of the invention, a control unit 300 can be provided arranged to receive data concerning the second angular velocity ω2 at which the second rotor 25 rotates and to actuate the third motor 83 of the treatment section in order to cause the third rotor 35 to rotate at a correspondent angular velocity ω3, when the angular velocity ω2 is determined that allows to have a determined yield η at the extraction section 20. More precisely, as described above, the ratio between the angular velocity ω3 and the angular velocity ω2 is equal to a value comprised between 1.5 and 3.5, advantageously equal to a value comprised between 2 and 3. Therefore, once a determined yield is obtained for the second extraction section 20, in particular during a preliminary calibration, or testing, step, the control unit 300 actuates the motor 83 of the treatment section 30 in order to cause the rotor 35 at the aforementioned angular velocity ω3 and to have an extracted product 104 with determined properties, in particular a high viscosity.

Figure 13:
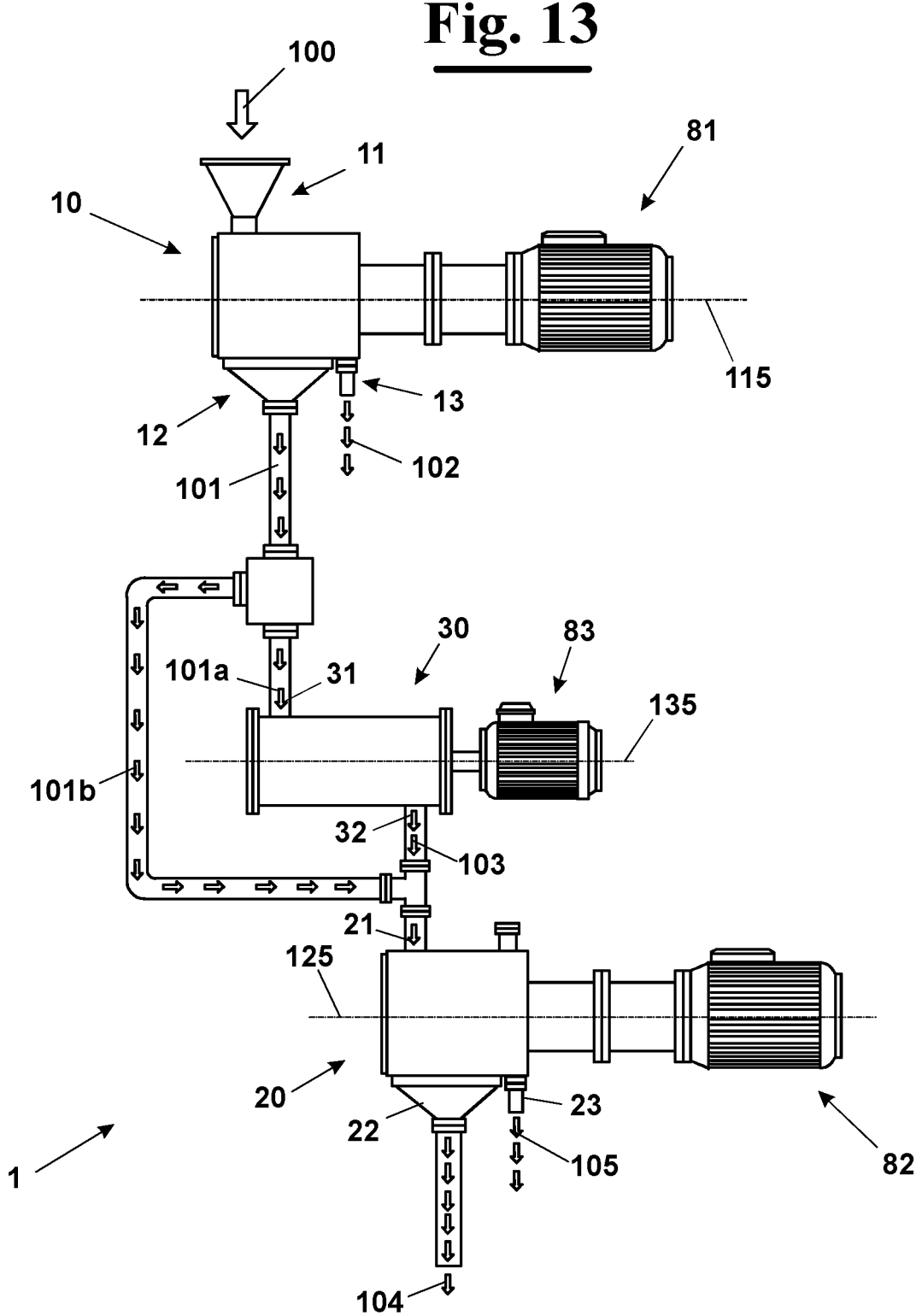

According to the embodiment diagrammatically shown in FIG. 13, between the first extraction section 10 and the treatment section 30 a diverter device 70 is provided. This, for example a three way electro-valve, is configured to divert the flow of extracted product 101 exiting the first extraction section 10 and to divide the same into a first flow 101a, which is fed into the treatment section 30 where is subjected to the treatment as described above, and a second flow 101b, which, instead, bypasses the treatment section 30 and is directly fed downstream of the same. More in particular, the second flow 101b can be directly fed into the second extraction section 20, case that is not shown in the figure for reasons of simplicity, or, as shown in the example of FIG. 13, mixed with the treated product 103 exiting the treatment section 30, for example by a "T" connector member, or by a second diverter device similar to the diverter device 70, not shown in the figure for reasons of simplicity, obtaining a mixed product, which is, therefore, fed into the second extraction section 20. In this way, it is possible to obtain a flow of product comprising a more viscous fraction essentially consisting of product 103 discharged from the treatment section 30, and obtained by treating the aforementioned first flow 101a, immersed in a more fluid fraction, essentially consisting of the aforementioned second flow 101b.

Figure 14:
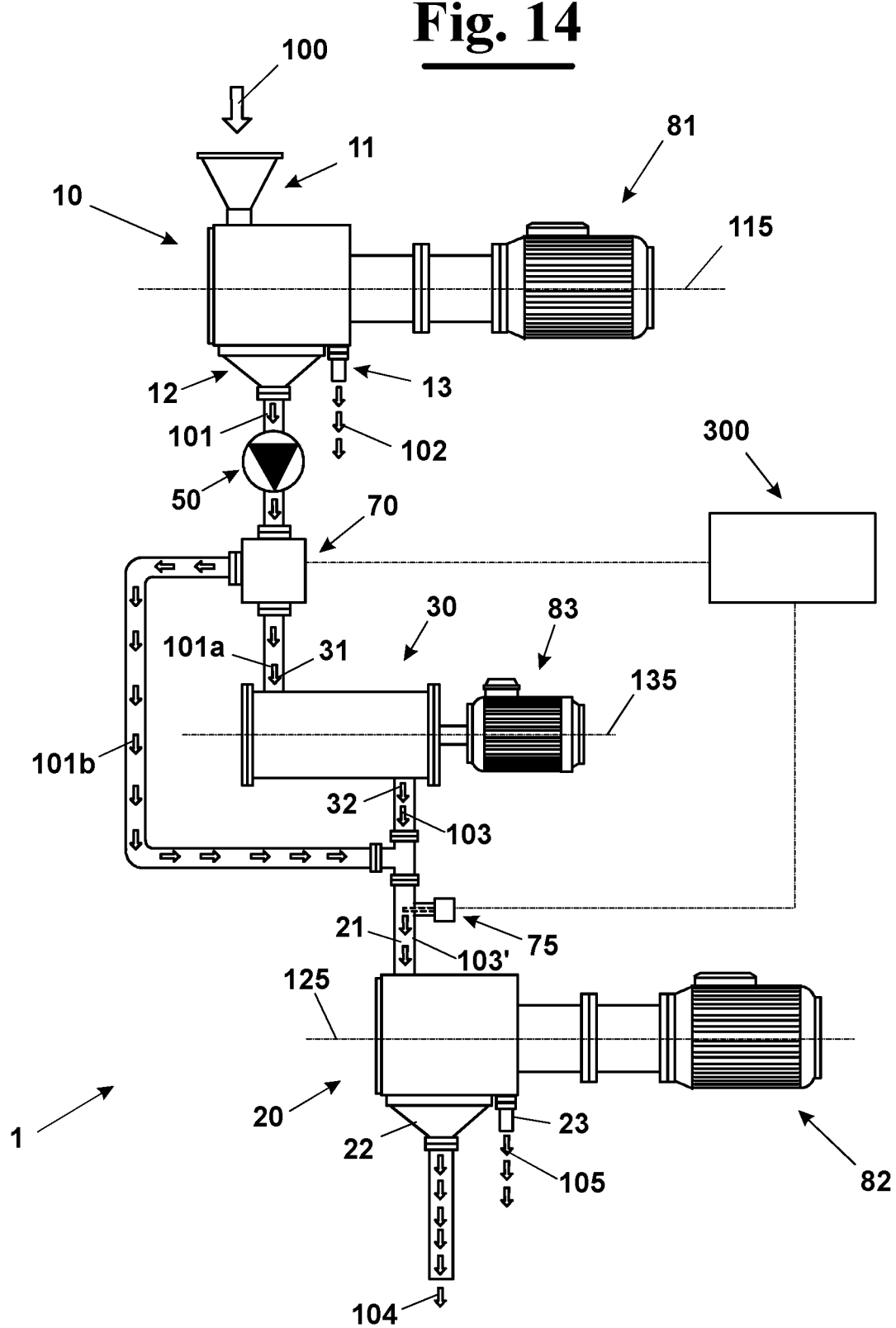

According to another embodiment of the invention, a device in-line is provided for measuring viscosity 75, for example a viscometer, positioned upstream, or downstream, of the second extraction section 20, for instantaneously determining the viscosity, respectively, of the product fed to the second extraction section 20, or the second extracted product 104. In particular, as shown in the example of FIG. 14, the device for measuring viscosity 75 can be arranged to send the detected signal of viscosity to a control unit 300, for example the same control unit 300, which actuates the driving groups 82 and 83, as described above. The control unit 300, according to the measured value of viscosity can actuate a greater, or less, opening of the diverter device 70 in order to increase, or decrease, the fraction of product 101, i.e. the first flow 101a, fed into the treatment section 30, and, therefore, to increase, or decrease, the viscosity of the product 103' fed into the second extraction section 20.

Figure 15:
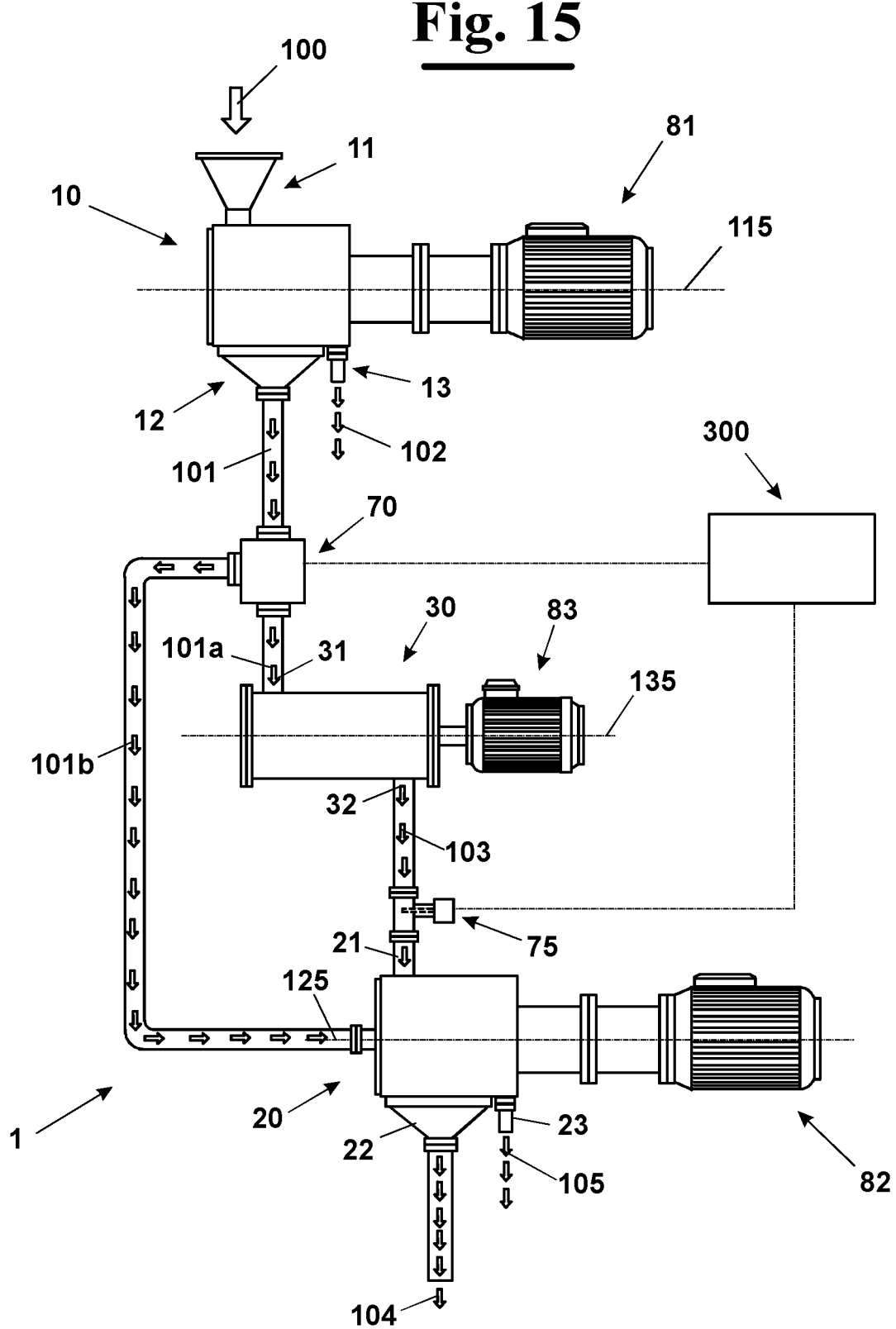

According to the further embodiment diagrammatically shown in FIG. 15, the second flow 101b of extracted product 101, which is diverted by the diverter device 70 to bypass the treatment section 30, is directly fed into the second extraction section 20, advantageously along an axial direction. Advantageously, also in this case, the aforementioned device 75 for measuring the viscosity with the same functions described above with reference to FIG. 14.

According to the invention, the first extraction section 10 can provide a first sieve 16 with holes of size greater than 1 mm, for example comprised between 4 mm and 8 mm. In this case, the first extraction section 10 will essentially work as a "stone remover", whilst the extraction of the main product, i.e. the puree and juice, will be a secondary effect. Alternatively, the holes 17 of the first sieve 16 can have a size greater than 10 mm, advantageously greater than 20 mm, preferably comprised between 10 mm and 30 mm. In this case, inside of the first extraction section 10, in particular in the case of fruits such as tomatoes, also the herbaceous and/or ligneous parts of the plant that is fed into the plant together with the fruits are cut and shredded, in order to avoid that the second extraction section 20, where, instead, the holes are advantageously smaller, in particular smaller than half size of the holes of the first sieve 16, can be obstructed due to the presence of the aforementioned herbaceous and/or ligneous parts.

According to a further embodiment of the invention, the holes 17 of the first sieve 16 can have a size comprised between 1 mm and 2 mm. In this case, therefore, in the first extraction section 10 a significant extraction operation of the main product, i.e. puree, or juice will be carried out.

Advantageously, the holes of the second sieve 26 can have a size comprised between 0.4 mm and 0.7 mm.

In particular the diameter of the primo, of the secondo and of the third rotor can be comprised between 200 and 1000 mm. More in particular, the diameter of the primo and of the second rotor 15 and 25 can be comprised between 200 and 850 mm, preferably comprise between 200 and 650 mm. Advantageously, the diameter of the third rotor can be comprised between 200 mm and 800 mm, preferably comprised between 200 and 600 mm.

Figure 16:
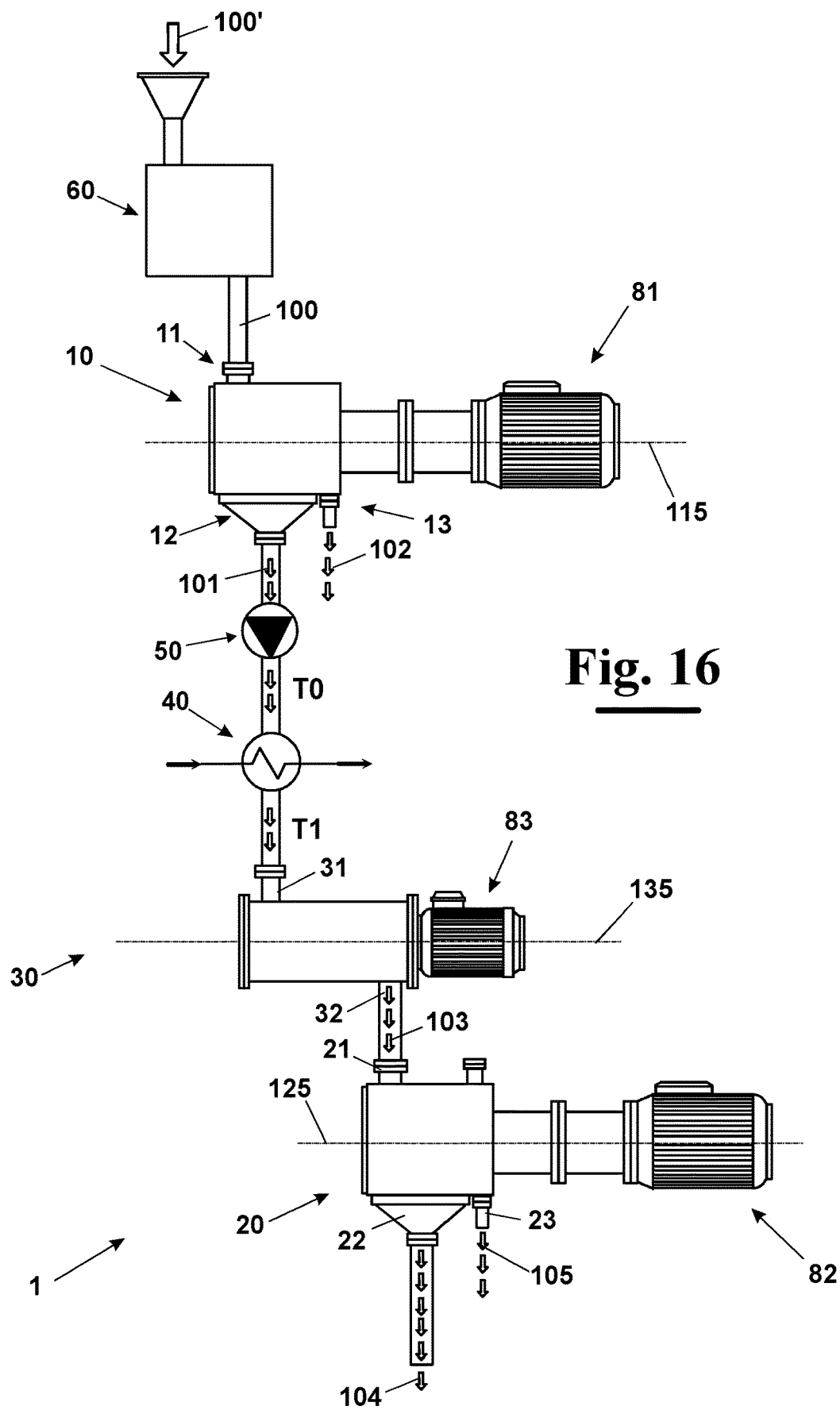

According to another embodiment of the invention, diagrammatically shown in FIG. 16, upstream of the first extraction section 10, a preliminary treatment section 60 can be provided configured to preliminary treat the food product of vegetable origin. According to an embodiment provided by the invention, the aforementioned preliminary treatment section 60 can be a division section configured to divide the starting food product of vegetable origin into pieces of predetermined size. In particular, the aforementioned preliminary treatment section 60 can be arranged to divide the starting food product of vegetable origin into pieces of size comprised between 2 mm and 50 mm, advantageously pieces of size comprised between 5 mm and 30 mm.

According to an alternative embodiment, the preliminary treatment section 60 can be configured to apply a sequence of compression stresses in rapid succession in order to reduce the consistency of the product. In particular the preliminary treatment section 60 can comprise a cylindrical, or conical, rotor actuated by a driving group to rotate within a stator, also this cylindrical, or conical shaped, in particular of the type described in EP0511174. Even though in FIG. 16 the preliminary treatment section 60 is shown positioned upstream of the embodiment of FIG. 11, the possibility is, anyway, also provided that the same can be positioned upstream of any embodiment according to the invention and in particular shown in the FIG. 1 and from 9 to 15.

According to an embodiment of the invention, the first extraction section 10 and the treatment section 30 can be positioned on the same line, advantageously be part of the same machine, preferably housed within the same machine body. In this case the product 101 extracted in the first extraction section 10 can be axially fed into the treatment section 30. In particular, the first extraction section 10 and the treatment section 30 can be actuated by the same driving group 82 arranged to cause the respective rotors 15 and 35 to rotate about the same rotation axis (case shown in FIG. 17).

According to another embodiment the treatment section 30 and the second extraction section 20 can be positioned on the same line and be part of the same machine. In particular, the treatment section 30 and the extraction section 20 can be actuated by the same driving group 82 arranged to cause the respective rotors 35 and 25 to rotate about the same rotation axis (case shown in FIG. 18).

Figure 17:
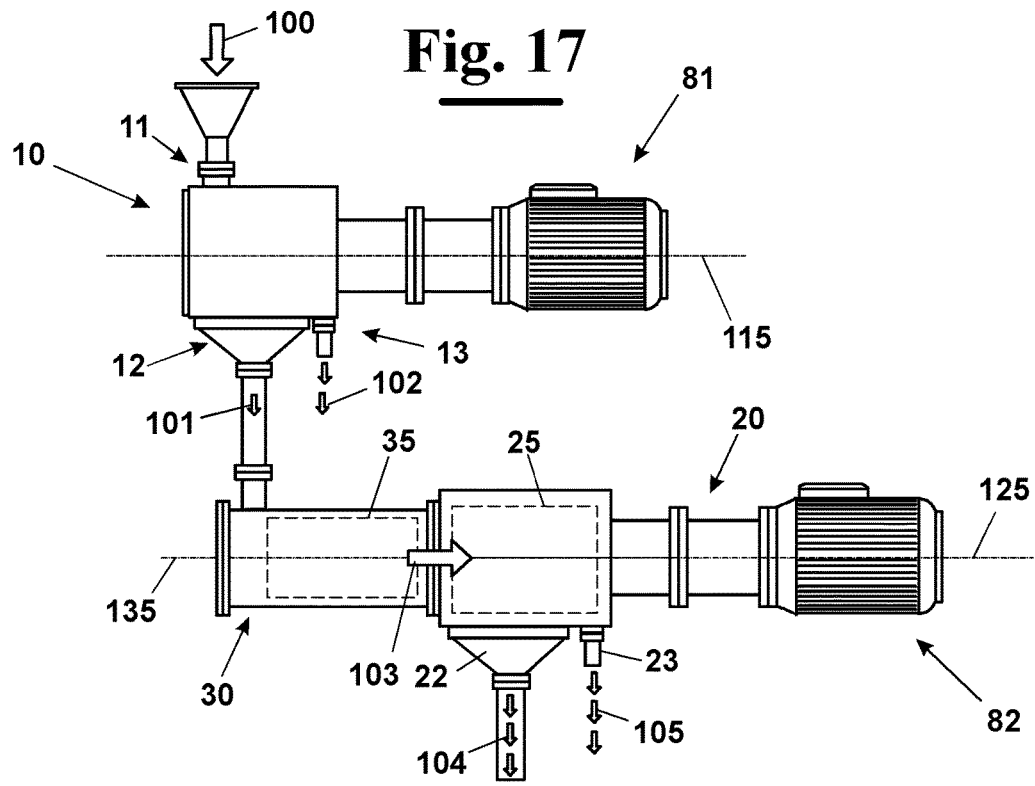
Figure 18:
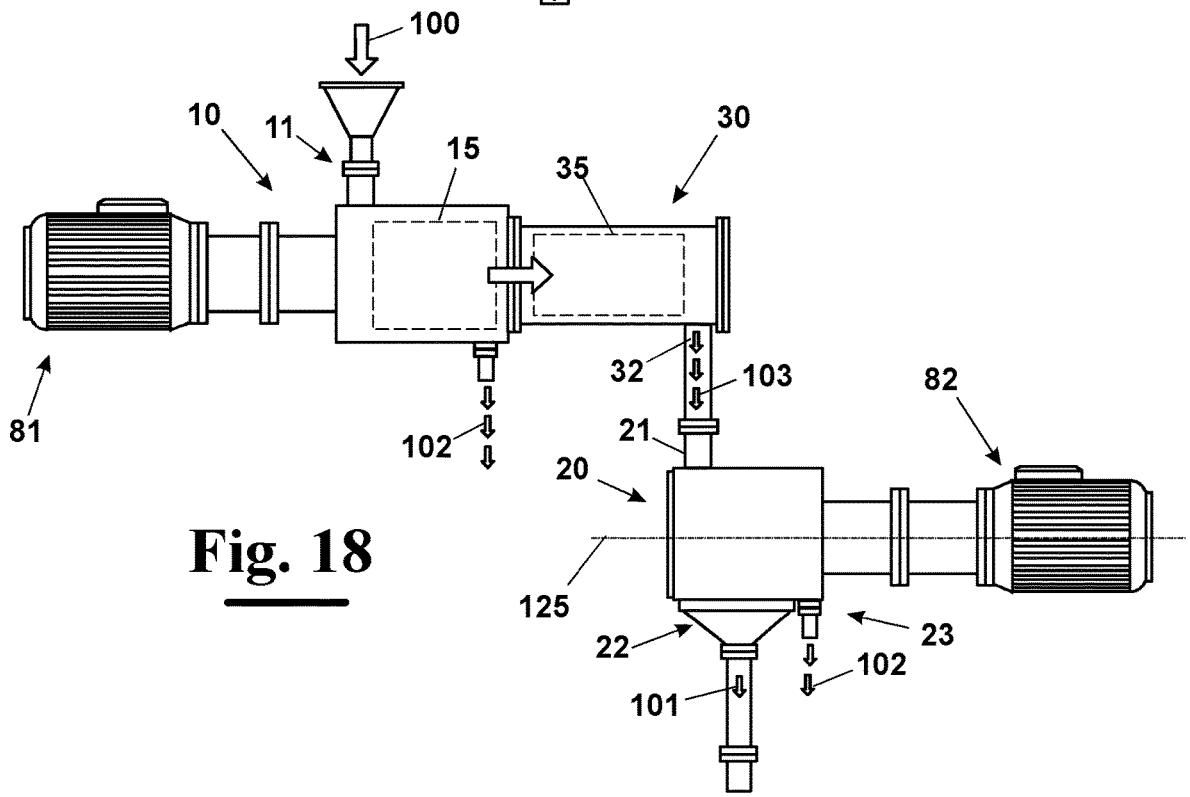

In particular, the embodiment of the first extraction section 10 and of the treatment section 30 that is shown in FIG. 17 as well as the embodiment of the treatment section 30 and of the second extraction section 20 shown in FIG. 18 can be used in any embodiment of plant 1 according to the invention 1 that are shown in the FIG. 1 and from 9 to 12.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A plant for producing juice and/or puree from a food product of vegetable origin, said plant comprising:
   a first extraction section configured to subject said food product to a first extraction operation the first extraction section including:
      an inlet for introducing said food product;
      a first rotor operatively connected to a first drive motor arranged to cause said first rotor to rotate about a first rotation axis at a first predetermined angular velocity ($\omega 1$); and
      a first sieve provided with a plurality of holes and arranged to be positioned externally to said first rotor, said food product being forced by said first rotor against said first sieve in such a way to divide the same into a first extracted food product comprising said puree, or juice, which passes through said first sieve and is discharged through a first outlet, and in a first waste product which, instead, does not pass through said sieve and is discharged through a second outlet; and
   a second extraction section positioned downstream of said first extraction section, said second extraction section being configured to subject an entering product to a second extraction operation the second extraction section including:
      an inlet for introducing said food product;
      a second rotor operatively connected to a second drive motor arranged to cause said second rotor to rotate about a second rotation axis at a second predetermined angular velocity ($\omega 2$); and
      a second sieve provided with a plurality of holes and arranged to be positioned externally to said second rotor, said introduced food product being forced by said second rotor against said second sieve in such a way to divide the same into a second extracted food product comprising said puree, or juice, which passes through said second sieve and is discharged through a first outlet, and in a second waste product which, instead, does not pass through said second sieve and is discharged through a second outlet;
   wherein:
      wherein a treatment section is furthermore provided positioned between said first extraction section and said second extraction section and comprising an inlet for introducing said first extracted food product, and an outlet for discharging a treated product arranged to be fed into said second extraction section,
      said treatment section is configured in such a way that the quantity of the food product entering the treatment section is equal to the quantity of treated product exiting the same, and
      said treatment section includes a fixed hollow body cylindrical, or conical shaped within which a third rotor is positioned also this cylindrical, or conical shaped in that said third rotor is operatively connected to a third drive motor configured to cause said third rotor to rotate about a third rotation axis at a third predetermined angular velocity ($\omega 3$) in that said third predetermined angular velocity ($\omega 3$) is greater than both the first predetermined angular velocity ($\omega 1$) and the second predetermined angular velocity ($\omega 2$), and in that said third predetermined angular velocity ($\omega 3$) is less than 8000 rpm, in such a way that said second extracted food product has a high viscosity.

2. The plant according to claim 1, wherein said third predetermined angular velocity ($\omega 3$) is less than 5000 rpm.

3. The plant according to claim 1, wherein said third predetermined angular velocity ($\omega 3$) is between 1500 and 4500 rpm.

4. The plant according to claim 1, wherein said third predetermined angular velocity ($\omega 3$) is less than 3500 rpm.

5. The plant according to claim 1, wherein said third predetermined angular velocity ($\omega 3$) is between 900 rpm and 3000 rpm.

6. The plant according to claim 1, wherein said third predetermined angular velocity ($\omega 3$) is between 1200 and 2700 rpm.

7. The plant according to claim 1, wherein said second predetermined angular velocity ($\omega 2$) is between 400 and 4000 rpm.

8. The plant according to claim 1, wherein said third rotor is provided with a plurality of blades at least a part of which provided with an edge facing, in use, towards said fixed hollow body having a plurality of recessed portions.

9. The plant according to claim 1, wherein between said first extraction section and said treatment section, a heating section is provided configured to heat said first extracted food product from a first temperature T1 to a second temperature T2 with T2>T1.

10. The plant according to claim 1, wherein downstream of said first extraction section, a pumping device is provided configured to pump said first extracted food product into said treatment section.

11. The plant according to claim 1, wherein said treatment section is positioned at a first height (hi) and said second extraction section is positioned at a second height with h1>h2, in such a way that said treated product exiting said treatment section is arranged to be introduced into said second extraction section by gravity.

12. The plant according to claim 1, wherein said fixed hollow body has an internal surface facing towards said rotor which is selected from the group consisting of:
a smooth surface;
a surface provided with a plurality of recessed portions;
a surface provided with a plurality of protruding portions; and
a surface comprising a plurality of recessed portions and a plurality of protruding portions alternating to each other; or
a combination thereof.

13. The plant according to claim 1, wherein:
said fixed hollow body has an internal surface facing towards said rotor comprising a plurality of recessed portions and a plurality of protruding portions alternating to each other,
said recessed portions are positioned at a maximum distance (dmax) from said rotor, and wherein said protruding portions are positioned at a minimum distance (dmin) from said rotor, and
the ratio between said maximum distance (dmax) and said minimum distance (dmin) is between 1 and 20.

14. The plant according to claim 1, wherein a control unit is provided and configured to receive the second predetermined angular velocity ($\omega 2$) and to actuate said third drive motor to cause said third rotor to rotate at a corresponding third angular velocity ($\omega 3$), once that for said second extraction section a yield greater than a determined threshold value has been reached.

15. The plant according to claim 1, wherein between said first extraction section and said treatment section a diverter device is provided configured to divert said first extracted product and divide the same into a first flow which is fed into said treatment section, and a second flow which is fed downstream of said treatment section bypassing said treatment section.

16. The plant according to claim 15, wherein a device for measuring the viscosity is, furthermore, provided configured to measure the viscosity of said product fed into said second extraction section and/or said second extracted product and to send a corresponding signal to a control unit, said control unit being configured to operate said diverter device in order to increase, or decrease, said first flow of said first extracted product fed into said treatment section and, therefore, to increase, or decrease, respectively, the viscosity of said product fed into said second extraction section.

17. The plant according to claim 1, wherein said surface of said fixed hollow body is at least equal to 50% of the surface of said second sieve of said second extraction section.

18. The plant according to claim 1, wherein said third rotation axis of said third rotor is a horizontal rotation axis.

19. The plant according to claim 8, wherein at least a part of said blades of said third rotor, at an edge arranged to face, in use, towards said internal wall of said fixed hollow body is provided with a plurality of recessed portions, or depressions.

20. The plant according to claim 19, wherein said recessed portions have all a same width and depth.

21. The plant according to claim 19, wherein said recessed portions have a width and/or a depth which decreases going from said inlet to said outlet of said treatment section.

22. The plant according to claim 1, wherein said third rotor has a diameter $\Phi 3$ between 200 and 1000 mm.

23. The plant according to claim 1, wherein said third rotor has a diameter $\Phi 3$ between 400 and 500 mm.

24. The plant according to claim 1, wherein said holes of said first sieve have a size greater than, or equal to two times the size of said holes of said second sieve.

25. The plant according to claim 1, wherein said holes of said first sieve have a size greater than 5 mm.

26. The plant according to claim 1, wherein said holes of said first sieve have a size greater than 10 mm.

27. The plant according to claim 1, wherein said holes of said first sieve have a size greater than 20 mm.

28. The plant according to claim 1, wherein said holes of said first sieve have a size between 5 mm and 30 mm.

29. The plant according to claim 1, wherein said holes of said first sieve have a size between 10 mm and 30 mm.

30. The plant according to claim 1, wherein upstream of said first extraction section, a softening section is furthermore provided configured to apply a series of compression stresses in rapid succession to the food product of vegetable origin.

31. The plant according to claim 30, wherein said division section is configured to divide said starting food product of vegetable origin into pieces of size between 5 mm and 50 mm.

32. The plant according to claim 1, wherein upstream of said first extraction section, a division section is furthermore provided configured to divide a starting food product of vegetable origin into pieces of predetermined size.

33. A method for producing juice and/or puree from a food product, comprising:
extracting in a first extraction section a starting food product, said extraction section being equipped with a first sieve provided with a plurality of holes and with a first rotor mounted within said first sieve and operatively connected to a first motor, said first motor being arranged to cause said first rotor to rotate about a first rotation axis to generate a centrifugal force which pushes said starting food product against said sieve causing the same to be divided into a first extracted food product which passes through the holes of said first sieve and is discharged through a first outlet, and a first waste product which does not pass through said holes of said sieve and is discharged through a second outlet;
feeding a predetermined quantity of said first extracted food product in a treatment section positioned downstream of said first extraction section;
treating said first extracted food product within said treatment section obtaining a treated product;

discharging of a predetermined quantity of said treated product from said treatment section, said predetermined quantity of said treated product discharged being equal to said predetermined quantity of said first extracted food product that is fed into said treatment section; and feeding said treated product into a second extraction section, said second extraction section being equipped with a second sieve provided with a plurality of holes and with a second rotor mounted within said second sieve and operatively connected to a second drive motor, said second drive motor being arranged to cause said second rotor to rotate about a second rotation axis in order to generate a centrifugal force which pushes said treated food product against said second sieve thus causing the same to be divided into a second extracted food product which passes through the holes of said second sieve and is discharged through a first outlet and a second waste product which does not pass through said holes of said second sieve and is discharged through a second outlet;

wherein:
  the quantity of said first extracted product fed into said treatment section is equal to the quantity of said treated product discharged from said treatment section and fed into said second extraction section;
  said treatment is carried out by a third rotor having a cylindrical, or conical, shape arranged within a fixed hollow body also this cylindrical, or conical shaped and in that said third rotor is operatively connected to a third drive motor configured to cause said third rotor to rotate about a third rotation axis at a third predetermined angular velocity ($\omega 3$);
  said third predetermined angular velocity ($\omega 3$) is greater both than a first angular velocity ($\omega 1$) of said first rotor and a second angular velocity ($\omega 2$) of said second rotor; and
  said third predetermined angular velocity ($\omega 3$) is less than 8000 rpm, in such a way that said second extracted food product has a high viscosity.

\* \* \* \* \*